(12) United States Patent
Patel et al.

(10) Patent No.: US 10,925,094 B2
(45) Date of Patent: Feb. 16, 2021

(54) SCHEDULING REQUEST TECHNIQUES IN WIRELESS TRANSMISSIONS

(71) Applicant: QUALCOMM Incorporated, San Diego, CA (US)

(72) Inventors: Shimman Arvind Patel, San Diego, CA (US); Wanshi Chen, San Diego, CA (US); Seyedkianoush Hosseini, San Diego, CA (US); Alberto Rico Alvarino, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/956,932

(22) Filed: Apr. 19, 2018

(65) Prior Publication Data

US 2018/0332624 A1 Nov. 15, 2018

Related U.S. Application Data

(60) Provisional application No. 62/505,685, filed on May 12, 2017.

(51) Int. Cl.
*H04W 4/00* (2018.01)
*H04W 74/08* (2009.01)
(Continued)

(52) U.S. Cl.
CPC ....... *H04W 74/0833* (2013.01); *H04W 72/04* (2013.01); *H04W 72/12* (2013.01); *H04W 72/1278* (2013.01)

(58) Field of Classification Search
None
See application file for complete search history.

(56) References Cited

U.S. PATENT DOCUMENTS 9,814,066 B2 11/2017 Bertrand et al.
10,039,134 B2 * 7/2018 Cho ................ H04W 76/18
(Continued)

FOREIGN PATENT DOCUMENTS

WO WO-2016175631 A1 11/2016
WO WO-2017023352 A1 2/2017

OTHER PUBLICATIONS

Institute for Information Industry (III): "Discussion on Beam Failure Recovery Mechanism", 3GPP Draft, R1-1708874_Discussion on Beam Failure Recovery Mechanism, 3rd Generation Partnership Project (3GPP), Mobile Competence Centre, 650, Route Des Lucioles, F-06921, Sophia-Antipolis Cedex, F, vol. RAN WG1, No. Hangzhou, China; May 15, 2017-May 19, 2017, May 5, 2017 (May 5, 2017), XP051261459, pp. 1-5, Retrieved from the Internet: URL:http://www.3gpp.org/ftp/tsg_ran/WG1_RL1/TSGR1_89/Docs/ [retrieved on May 5, 2017].

(Continued)

*Primary Examiner* — Kwang B Yao
*Assistant Examiner* — Juvena W Loo
(74) *Attorney, Agent, or Firm* — Qualcomm Incorporated; Ke Liu

(57) ABSTRACT

Methods, systems, and devices for wireless communication are described that provide scheduling request (SR) resources that may be used by a user equipment (UE) to request uplink resources. SR resources may be allocated within random access channel resources, and a UE may use the SR resources to transmit a SR. The random access resources may be allocated in a first duration transmission time interval (TTI) that has a duration that is shorter than a second duration TTI. The SR resources may be a subset of random access preambles associated with the random access resources.

30 Claims, 20 Drawing Sheets

(51) Int. Cl.
H04W 72/04 (2009.01)
H04W 72/12 (2009.01)

(56) References Cited

U.S. PATENT DOCUMENTS

| | | |
|---|---|---|
| 10,117,188 B2 * | 10/2018 | Nory ................... H04L 5/0007 |
| 2015/0351132 A1 | 12/2015 | Park et al. |
| 2017/0265181 A1 | 9/2017 | Patel et al. |
| 2017/0272214 A1 | 9/2017 | Chen et al. |
| 2017/0290008 A1 | 10/2017 | Tooher et al. |
| 2018/0063869 A1 * | 3/2018 | Zhang ................ H04W 74/004 |
| 2018/0124829 A1 * | 5/2018 | Lee ........................ H04L 5/00 |
| 2018/0227958 A1 * | 8/2018 | Xiong ............. H04W 72/0406 |
| 2018/0249374 A1 * | 8/2018 | Park ....................... H04J 11/00 |
| 2018/0263060 A1 * | 9/2018 | Tirronen ............ H04W 74/006 |
| 2019/0007324 A1 * | 1/2019 | Sebire .................. H04L 47/283 |
| 2019/0098653 A9 * | 3/2019 | Nory .................... H04L 5/0048 |
| 2019/0174525 A1 * | 6/2019 | Kwak ....................... H04L 5/00 |

OTHER PUBLICATIONS

International Search Report and Written Opinion—PCT/US2018/028650—ISA/EPO—dated Jul. 3, 2018.

* cited by examiner

SCHEDULING REQUEST TECHNIQUES IN WIRELESS TRANSMISSIONS

CROSS REFERENCES

The present application for patent claims the benefit of U.S. Provisional Patent Application No. 62/505,685, entitled "Scheduling Request Techniques in Wireless Transmissions," filed May 12, 2017, assigned to the assignee hereof, and expressly incorporated herein.

BACKGROUND

The following relates generally to wireless communication, and more specifically to scheduling request (SR) techniques in wireless transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. An example telecommunication standard is LTE. LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

A base station in some LTE or NR deployments may transmit to one or more UEs using a transmission time interval (TTI) that is reduced in length relative to legacy LTE TTIs. Such a TTI may be referred to as a shortened TTI (sTTI) and users communicating using sTTIs may be referred to as low latency users. A sTTI may be a subset of one or more subframes that correspond to legacy TTI subframes. The use of sTTIs may help reduce latency for wireless communications and may be used in some cases when low latency communications are desirable. A base station may allocate transmission resources for sTTIs to a UE that may include time and/or frequency resources. Efficient allocation of such resources for data, requests for resource allocations, and communications related to allocations may help to further reduce latency for users and may help to increase the efficiency of a wireless communications system.

SUMMARY

The described techniques relate to improved methods, systems, devices, or apparatuses that support scheduling request (SR) techniques in wireless transmissions. Generally, the described techniques provide for SR resources that may be used by a user equipment (UE) to request uplink resources. In some cases, a base station may allocate SR resources within random access channel resources, and a UE may use the SR resources to transmit a SR. In some examples, the random access resources may be allocated in a first duration transmission time interval (TTI) that has a duration that is shorter than a second duration TTI (e.g., a 1 ms legacy LTE TTI duration). In some instances, the SR resources may be a subset of random access preambles associated with the random access resources. In some aspects, the first duration TTI may correspond to a two-symbol TTI or a three-symbol TTI. In some cases, the three-symbol TTI may include a reference signal transmission in the last symbol of the TTI, and in such cases the random access resources of the three-symbol TTI may be converted to random access resources for a two-symbol TTI.

A method of wireless communication is described. The method may include identifying first random access resources within a first duration TTI and second random access resources within a second duration TTI, where the first duration TTI is shorter than the second duration TTI, generating a SR using resources allocated for SRs within the first random access resources, and transmitting the SR.

An apparatus for wireless communication is described. The apparatus may include means for identifying first random access resources within a first duration TTI and second random access resources within a second duration TTI, where the first duration TTI is shorter than the second duration TTI, means for generating a SR using resources allocated for SRs within the first random access resources, and means for transmitting the SR.

Another apparatus for wireless communication is described. The apparatus may include a processor, memory in electronic communication with the processor, and instructions stored in the memory. The instructions may be operable to cause the processor to identify first random access resources within a first duration TTI and second random access resources within a second duration TTI, where the first duration TTI is shorter than the second duration TTI, generate a SR using resources allocated for SRs within the first random access resources, and transmit the SR.

A non-transitory computer readable medium for wireless communication is described. The non-transitory computer-readable medium may include instructions operable to cause a processor to identify first random access resources within a first duration TTI and second random access resources within a second duration TTI, where the first duration TTI is shorter than the second duration TTI, generate a SR using resources allocated for SRs within the first random access resources, and transmit the SR.

In some examples of the method, apparatus, and non-transitory computer-readable medium described above, the resources allocated for SRs include a cyclic shift for use when transmitting the SR. Some examples of the method, apparatus, and non-transitory computer-readable medium described above may further include processes, features, means, or instructions for receiving the cyclic shift in radio resource control (RRC) signaling from a base station.

In some examples of the method, apparatus, and non-transitory computer-readable medium described above, the first random access resources include a first subset of resources corresponding to the resources allocated for SRs and a second subset of resources allocated for random access requests. In some examples of the method, apparatus, and non-transitory computer-readable medium described above, the first subset of resources include a first subset of random access preamble signatures for transmitting SRs and the second subset of resources include a second subset of random access preamble signatures for transmitting random access requests.

In some examples of the method, apparatus, and non-transitory computer-readable medium described above, the first subset of resources and the second subset of resources may be time-varying across a plurality of first duration TTIs. In some examples of the method, apparatus, and non-transitory computer-readable medium described above, the second subset of resources may be split to include contention-based resources and contention-free resources. Some examples of the method, apparatus, and non-transitory computer-readable medium described above may further include processes, features, means, or instructions for identifying which of a plurality of first duration TTIs include the first random access resources based on configuration information received from a base station. In some examples of the method, apparatus, and non-transitory computer-readable medium described above, the configuration information includes one or more of a periodicity function or a bitmap for determining which of the plurality of first duration TTIs include the first random access resources.

Some examples of the method, apparatus, and non-transitory computer-readable medium described above may further include processes, features, means, or instructions for determining a timing advance (TA) value for transmissions between a UE and a base station. Some examples of the method, apparatus, and non-transitory computer-readable medium described above may further include processes, features, means, or instructions for providing the TA value to the base station, and where the first duration TTI that includes the first random access resources may be selected from two or more TTI durations that may be shorter than the second duration TTI. In some examples of the method, apparatus, and non-transitory computer-readable medium described above, the two or more TTI durations include a two-symbol TTI duration and a three-symbol TTI duration, and the three-symbol TTI duration may be selected responsive to the TA value exceeding a first threshold value. Some examples of the method, apparatus, and non-transitory computer-readable medium described above may further include processes, features, means, or instructions for determining that the TA value exceeds a second threshold value. Some examples of the method, apparatus, and non-transitory computer-readable medium described above may further include processes, features, means, or instructions for generating a second SR using second random access resources within the second duration TTI. In some examples of the method, apparatus, and non-transitory computer-readable medium described above, the second duration TTI corresponds to a one millisecond TTI duration.

Some examples of the method, apparatus, and non-transitory computer-readable medium described above may further include processes, features, means, or instructions for determining that a second SR may be to be transmitted to a base station. Some examples of the method, apparatus, and non-transitory computer-readable medium described above may further include processes, features, means, or instructions for determining that a feedback transmission may be to be transmitted to the base station to indicate successful or unsuccessful reception of a received transmission. Some examples of the method, apparatus, and non-transitory computer-readable medium described above may further include processes, features, means, or instructions for generating the second SR using resources within a control channel allocated for the feedback transmission.

Some examples of the method, apparatus, and non-transitory computer-readable medium described above may further include processes, features, means, or instructions for receiving an indication of the resources allocated for SRs within the first random access resources from a base station, the resources allocated for SRs comprising a subset of available preamble signatures associated with the first random access resources. In some examples of the method, apparatus, and non-transitory computer-readable medium described above, the first random access resources include a set of available preamble signatures for a four-step random access procedure used for the SR. In some examples of the method, apparatus, and non-transitory computer-readable medium described above, the first random access resources include a first preamble signature for use in transmitting the SR, the first preamble signature selected based on a likelihood of signature usage. In some examples of the method, apparatus, and non-transitory computer-readable medium described above, one or more of a cyclic shift spacing between the first preamble signature and one or more other preamble signatures or a contention category of the first preamble signature may be selected based on the likelihood of signature usage. In some examples of the method, apparatus, and non-transitory computer-readable medium described above, one or more of a cyclic shift spacing between the first preamble signature and one or more other preamble signatures or a contention category of the first preamble signature may be selected based on a spatial separation of transmitters that may concurrently transmit using the first random access resources.

In some examples of the method, apparatus, and non-transitory computer-readable medium described above, the first duration TTI spans three orthogonal frequency division multiplexing (OFDM) symbols, and where the identifying further includes: determining that a reference signal may be to be transmitted in a last OFDM symbol of the first duration TTI. Some examples of the method, apparatus, and non-transitory computer-readable medium described above may further include processes, features, means, or instructions for identifying the first random access resources according to a two-OFDM symbol TTI configuration rather than a three-OFDM symbol TTI configuration.

A method of wireless communication is described. The method may include identifying first random access resources within a first duration TTI and second random access resources within a second duration TTI, where the first duration TTI is shorter than the second duration TTI, allocating SR resources within the first random access resources for use by at least one UE, and receiving a SR from the UE over the SR resources.

An apparatus for wireless communication is described. The apparatus may include means for identifying first random access resources within a first duration TTI and second random access resources within a second duration TTI, where the first duration TTI is shorter than the second duration TTI, means for allocating SR resources within the first random access resources for use by at least one UE, and means for receiving a SR from the UE over the SR resources.

Another apparatus for wireless communication is described. The apparatus may include a processor, memory in electronic communication with the processor, and instructions stored in the memory. The instructions may be operable to cause the processor to identify first random access resources within a first duration TTI and second random access resources within a second duration TTI, where the first duration TTI is shorter than the second duration TTI, allocate SR resources within the first random access resources for use by at least one UE, and receive a SR from the UE over the SR resources.

A non-transitory computer readable medium for wireless communication is described. The non-transitory computer-readable medium may include instructions operable to cause a processor to identify first random access resources within a first duration TTI and second random access resources within a second duration TTI, where the first duration TTI is shorter than the second duration TTI, allocate SR resources within the first random access resources for use by at least one UE, and receive a SR from the UE over the SR resources.

In some examples of the method, apparatus, and non-transitory computer-readable medium described above, the SR resources include a cyclic shift for use when transmitting the SR. Some examples of the method, apparatus, and non-transitory computer-readable medium described above may further include processes, features, means, or instructions for transmitting the cyclic shift to the UE using RRC signaling. In some examples of the method, apparatus, and non-transitory computer-readable medium described above, the first random access resources include a first subset of resources for use in transmitting SRs and a second subset of resources for use in transmitting random access requests.

In some examples of the method, apparatus, and non-transitory computer-readable medium described above, the first subset of resources include a first subset of random access preamble signatures for transmitting SRs and the second subset of resources include a second subset of random access preamble signatures for transmitting random access requests. In some examples of the method, apparatus, and non-transitory computer-readable medium described above, the first subset of resources and the second subset of resources may be time-varying across a plurality of first duration TTIs. In some examples of the method, apparatus, and non-transitory computer-readable medium described above, the second subset of resources may be split to include contention-based resources and contention-free resources. In some examples of the method, apparatus, and non-transitory computer-readable medium described above, one or more of a periodicity function or a bitmap may be configured at the UE to determine which of a plurality of first duration TTIs include the first random access resources.

Some examples of the method, apparatus, and non-transitory computer-readable medium described above may further include processes, features, means, or instructions for receiving a TA value for transmissions of the UE. Some examples of the method, apparatus, and non-transitory computer-readable medium described above may further include processes, features, means, or instructions for selecting the first duration TTI from two or more TTI durations that may be shorter than the second duration TTI based on the TA value. In some examples of the method, apparatus, and non-transitory computer-readable medium described above, the two or more TTI durations include a two-symbol TTI duration and a three-symbol TTI duration, and the three-symbol TTI duration may be selected responsive to the TA value exceeding a first threshold value. Some examples of the method, apparatus, and non-transitory computer-readable medium described above may further include processes, features, means, or instructions for determining that the TA value exceeds a second threshold value, and configuring the UE to use the second random access resources within the second duration TTI for SR transmissions. In some examples of the method, apparatus, and non-transitory computer-readable medium described above, the second duration TTI corresponds to a one millisecond TTI duration.

Some examples of the method, apparatus, and non-transitory computer-readable medium described above may further include processes, features, means, or instructions for configuring the UE to transmit SRs using a control channel allocated for feedback transmission when the UE may have a feedback transmission to be transmitted along with the SR.

In some examples of the method, apparatus, and non-transitory computer-readable medium described above, the SR resources include a subset of available preamble signatures associated with the first random access resources. In some examples of the method, apparatus, and non-transitory computer-readable medium described above, the first random access resources include a set of available preamble signatures for a four-step random access procedure used for the SR. In some examples of the method, apparatus, and non-transitory computer-readable medium described above, the first random access resources include a first preamble signature for use in transmitting the SR, the first preamble signature selected based on a likelihood of signature usage. In some examples of the method, apparatus, and non-transitory computer-readable medium described above, one or more of a cyclic shift spacing between the first preamble signature and one or more other preamble signatures or a contention category of the first preamble signature may be selected based on the likelihood of signature usage. In some examples of the method, apparatus, and non-transitory computer-readable medium described above, one or more of a cyclic shift spacing between the first preamble signature and one or more other preamble signatures or a contention category of the first preamble signature may be selected based on a spatial separation of UEs that may concurrently transmit using the first random access resources.

In some examples of the method, apparatus, and non-transitory computer-readable medium described above, the allocation of resources may include configuring a first set of random access resources for TTIs having a duration of two OFDM symbols and a second set of random access resources for TTIs having a duration of three OFDM symbols. Some examples of the method, apparatus, and non-transitory computer-readable medium described above may further include processes, features, means, or instructions for configuring the UE to use the first set of random access resources rather than the second set of random access resources in a three OFDM symbol TTI when a periodic reference signal may be to be transmitted in a last OFDM symbol of the three OFDM symbol TTI.

DETAILED DESCRIPTION

Figure 1:
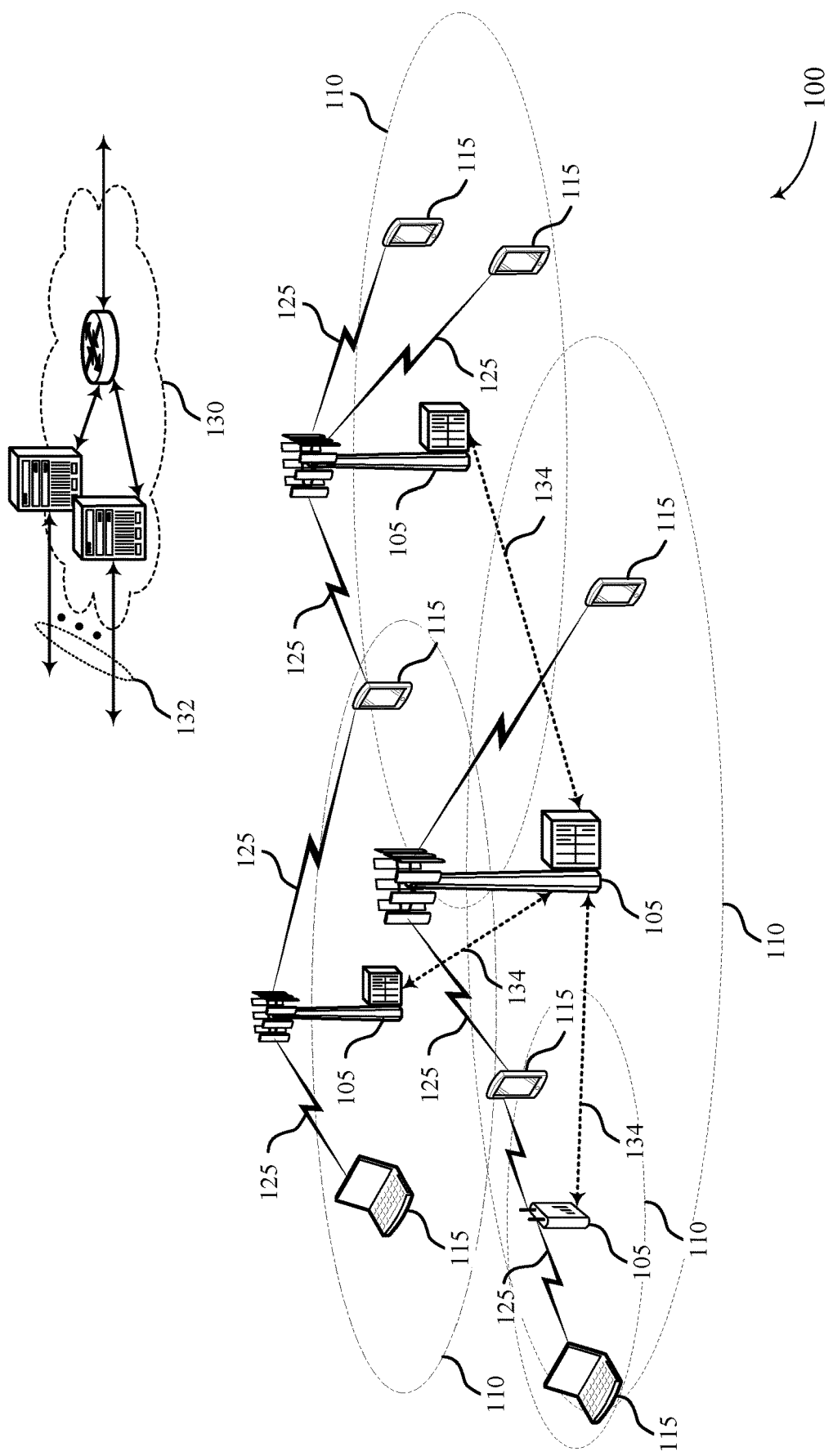
FIG. 1 illustrates an example of a wireless communications system that supports scheduling request (SR) techniques in wireless transmissions in accordance with aspects of the present disclosure.

Improved methods, systems, devices, or apparatuses of various examples may be used to support scheduling request (SR) transmissions with shortened transmission time intervals (TTIs) in low latency wireless communications. Resources allocated for low latency communications, such as ultra-reliable low latency communications (URLLC), may be used for uplink and downlink communication using shortened TTIs (sTTIs) that have a reduced length relative to TTIs of communications that may be relatively latency insensitive, such as mobile broadband (MBB) transmissions that may use a 1 ms TTI duration. Communications using sTTIs may use, in some cases, a TTI duration that corresponds to one slot of a wireless subframe, or a TTI duration that corresponds to two or three orthogonal frequency division multiplexing (OFDM) symbols, for example. In some examples, sTTIs may be configured to have boundaries within or aligned with boundaries of a slot of a 1 ms TTI, which may be referred to as slot-aligned TTIs. In some examples, the TTIs may span two or three OFDM symbols, and each slot may have two two-symbol TTIs and one three-symbol TTI. In such a manner, all seven symbols of a slot using a normal cyclic prefix (CP) may be utilized and system resources may be more efficiently utilized.

Various techniques as disclosed herein may provide configurations for SR transmissions in sTTIs, such as TTIs spanning two or three OFDM symbols. In some cases, a base station may allocate random access resources in certain sTTIs for random access request transmissions from a UE to the base station. The base station may allocate a portion of such random access resources for SR transmissions, the these SR resources may be used by a UE to request uplink resources. In some examples, the SR resources may be a subset of random access preambles associated with the random access resources. In some instances, a three-symbol TTI may include a reference signal transmission in the last symbol of the TTI, and in such cases the random access resources of the three-symbol TTI may be converted to random access resources for a two-symbol TTI.

Such low latency communications may be used in systems, for example, that may support multiple different services for data communications that may be selected depending upon the nature of the communications. For example, communications that require low latency and high reliability, sometimes referred to as mission critical (MiCr) communications, may be served through a lower-latency service (e.g., a URLLC service) that uses sTTIs. Correspondingly, communications that are more delay-tolerant may be served through a service that provides relatively higher throughput with somewhat higher latency, such as a mobile broadband service (e.g., an enhanced MBB (eMBB) service) that uses 1 ms TTIs. In other examples, communications may be with UEs that are incorporated into other devices (e.g., meters, vehicles, appliances, machinery), and a machine-type communication (MTC) service (e.g., massive MTC (mMTC)) may be used for such communications. In some cases, different services (e.g., eMBB, URLLC, mMTC) may have different TTIs, different sub-carrier (or tone) spacing and different CPs.

Aspects of the disclosure are initially described in the context of a wireless communications system. Aspects of the disclosure are further illustrated by and described with reference to apparatus diagrams, system diagrams, and flowcharts that relate to SR techniques in wireless transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., MiCr) communications, low latency communications, and communications with low-cost and low-complexity devices. UEs 115 and base stations 105 may communicate using low latency communications in which SR resources may be allocated within random access resources.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a MTC device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some examples, groups of UEs 115 communicating via D2D communications may utilize a one-to-many (1:M) system in which each UE 115 transmits to every other UE 115 in the group. In some instances, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1). Base stations 105 may communicate with one another over backhaul links 134 (e.g., X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and ANCs) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some examples, this may facilitate use of antenna arrays within a UE 115 (e.g., for directional beamforming). However, EHF transmissions may be subject to even greater atmospheric attenuation and shorter range than UHF transmissions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some examples perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and a network device, network device, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the CP prepended to each symbol). Excluding the CP, each symbol contains 2048 sample periods. In some cases the subframe may be the smallest scheduling unit, also known as a TTI. In other cases, such as discussed herein, a TTI may be shorter than a subframe or may be dynamically selected (e.g., in sTTI bursts or in selected component carriers using sTTIs).

A resource element may consist of one symbol period and one subcarrier (e.g., a 15 kHz frequency range). A resource block (RB) may contain 12 consecutive subcarriers in the frequency domain and, for a normal CP in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more RBs that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for CA. CA may be used with both FDD and TDD component carriers.

In some cases, wireless communications system 100 may utilize enhanced CCs (eCCs). An eCC may be characterized by one or more features including: wider bandwidth, shorter symbol duration, shorter TTIs, and modified control channel configuration. In some examples, an eCC may be associated with a CA configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, or 80 MHz) at reduced symbol durations (e.g., 16.67 microseconds). A TTI in eCC may consist of one or multiple symbols. In some examples, the TTI duration (that is, the number of symbols in a TTI) may be variable.

In some cases, wireless communications system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some examples, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases, a base station 105 may configure certain resources for SR transmissions in sTTIs. In some examples, the base station 105 may allocate random access resources in certain sTTIs for random access request transmissions from a UE 115 to the base station 105. The base station 105 may allocate a portion of such random access resources for SR transmissions, the these SR resources may be used by the UE 115 to request uplink resources. In some instances, the SR resources may be a subset of random access preambles associated with the random access resources. In some aspects, a three-symbol TTI may include a reference signal transmission in the last symbol of the TTI, and in such cases the random access resources of the three-symbol TTI may be converted to random access resources for a two-symbol TTI.

Figure 2:
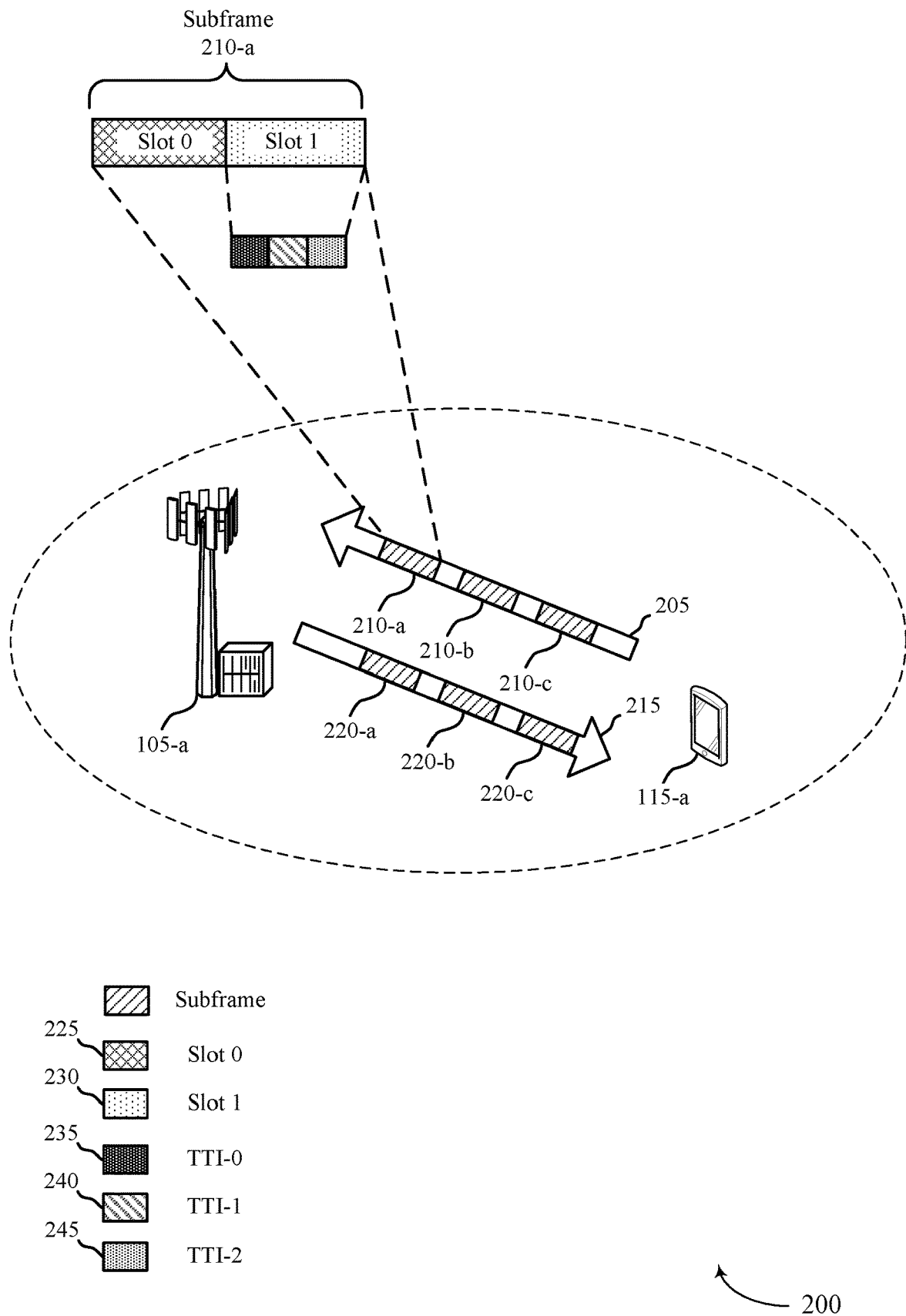
FIG. 2 illustrates an example of a wireless communications system that supports SR techniques in wireless transmissions in accordance with aspects of the present disclosure.

FIG. 2 illustrates an example of a wireless communications system 200 that supports SR techniques in wireless transmissions in accordance with various aspects of the present disclosure. Wireless communications system 200 includes base station 105-a and UE 115-a, which may be examples of aspects of a base station 105 and a UE 115 as described above with reference to FIG. 1. In the example of FIG. 2, the wireless communications system 200 may operate according to a radio access technology (RAT) such as a LTE, a 5G or NR RAT, although techniques described herein may be applied to any RAT and to systems that may concurrently use two or more different RATs.

Base station 105-a may communicate with UE 115-a over an uplink carrier 205 and a downlink carrier 215. In some examples, base station 105-a may allocate resources for communication with UEs 115 over uplink carrier 205 and downlink carrier 215. For example, base station 105-a may allocate uplink subframes 210 in uplink carrier 205 for uplink transmissions from UE 115-a, and one or more uplink subframes 210 may correspond to a legacy LTE TTI of 1 ms or a sTTI of two or three OFDM symbols. In this example, uplink subframes 210 may include a first uplink subframe 210-a, a second uplink subframe 210-b, and a third uplink subframe 210-c. Each of the uplink subframes 210 may include two slots, in which each slot may have seven OFDM symbols for a normal CP. In this example, a first slot (slot 0) 225 and a second slot (slot 1) 230 may be included in the first subframe 210-a.

As indicated above, in low latency communications, different TTI lengths may be used for transmissions over uplink carrier 205, downlink carrier 215, or both. For example, two or three symbol TTI and 1-slot TTI durations may be supported for physical random access channel (PRACH) transmissions (or shortened PRACH (sPRACH) transmissions). Thus, within first slot 225 or second slot 230, there may be multiple TTIs, such as a first TTI (TTI-0) 235, a second TTI (TTI-1) 240, and a third TTI (TTI-2) 245, that may each have a two or three OFDM symbol duration. Such TTI durations may also apply to downlink subframes 220 transmitted on downlink carrier 215. In some examples, different length TTIs may be used on the uplink carrier 205 and the downlink carrier 215, resulting in asymmetric TTI lengths for uplink and downlink transmissions.

When two or three symbol TTIs are used, in some cases it may be desirable to have a fixed TTI structure in which TTI boundaries lie within slot boundaries or are aligned with slot boundaries, such as the boundaries of the first slot 225 or second slot 230, which may be referred to as slot-aligned TTIs. As discussed above, when using a normal CP, seven symbols are included in each slot 225-230, and thus each slot may include three TTIs for slot-aligned TTIs. In some examples, one of the TTIs may be configured as a three-symbol TTI, so as to efficiently utilize each symbol of each slot. In such cases, different patterns can be considered, such as having the three-symbol TTI located at the end of a slot 225-230, or at the beginning of a slot 225-230. When using two-symbol TTIs or a combination of two-symbol and three-symbol TTIs, such TTIs may be referred to as 2-symbol TTIs. When using TTIs having a duration correspond to a subframe, such TTIs may be referred to as 1 ms TTIs or legacy TTIs.

Various aspects of the present disclosure provide SR techniques when using sTTIs. In some cases, the base station 105-a may configure PRACH resources within certain TTIs. Within the PRACH resources, the base station 105-a may further configure a subset of resources for SR transmissions. In some cases, the base station 105-a also may configure SR to transmitted in physical uplink control channel (PUCCH) transmissions (or shortened PUCCH (sPUCCH) transmissions) along with feedback information (e.g., HARQ feedback) that may be transmitted in the PUCCH transmissions. For example, additional cyclic shifts may be used with a within a 1 RB/two-symbol transmission to convey SR. In some examples, certain PRACH preambles may be reserved by the base station 105-a for SR transmissions, which may be communicated to the UE 115-a and then used by the UE 115-a to transmit SRs. In some instances, SR using sTTIs may use existing LTE legacy PRACH preamble format 4, and messages 1-4 of the PRACH procedure may be transmitted on the sTTI timelines, which may reduce overall latency for low latency communications. In some aspects, the PRACH resources may be allocated relatively frequently in order to help reduce startup latency for random access requests. Further, depending upon the level of loading at the base station 105-a, all PRACH resources may not be required, and SR resources in some cases may be allocated based on such loading. In such cases, if the UE 115-a does not have a feedback transmission (e.g., acknowledgement (ACK) feedback or negative ACK (NACK) feedback), it may instead send SR on assigned resource within the PRACH resource. In some examples, the allocated SR resources may be a portion of preamble signatures that may be allocated to connected mode UEs for SR, with remaining signatures used for fast random access functionality. In some instances, in order to avoid split band transmission on PUCCH and PRACH, if the UE 115-a has a SR and ACK/NACK that are both to be transmitted, it may transmit only in PUCCH resources. Such transmissions may help to provide a good peak to average power ratio (PAPR) and avoid radio frequency (RF) intermodulation performance issues due to split band transmissions.

When transmitting a SR on PRACH resources, in some cases a UE 115-a may use a contention-based two-step random access procedure with payload, or a signature-based four step random access procedure with and without contention, which may be implemented in 2 and 3 symbol length TTIs. In some examples, a UE 115-a may be in connected mode, and may be assigned a cyclic shift to transmit SR. The base station 105-a may reserve a first portion of the signatures within a TTI for SR and a second portion of the signature for PRACH functionality. Such reservations may be, for example, time varying in which the base station 105-a may reserve a time-varying portion of signatures across TTIs for SR functionality and for PRACH functionality. Additionally or alternatively, the signatures reserved for PRACH functionality can be split into contention-based and contention-free resources. The base station 105-a, in some case, may determine which TTIs within frame contain PRACH and provide an indication to the UE 115-a via a periodicity function or a bitmap. Further, in some instances, the base station 105-a may assign signatures to the UE 115-a based on UE characteristics, such that the base station 105-a may intelligently assign users to signatures based on users' likelihood of signature usage (e.g., low likelihood users can occupy cyclic shifts that are closely spaced, or can occupy signatures that have been assigned as contention-based). In some aspects, the base station 105-a may re-use certain signatures for multiple UEs based on a likelihood of the UEs to interfere with each other (e.g., users that can be spatially separated can be assigned cyclic shifts that are closely spaced).

Figure 3:
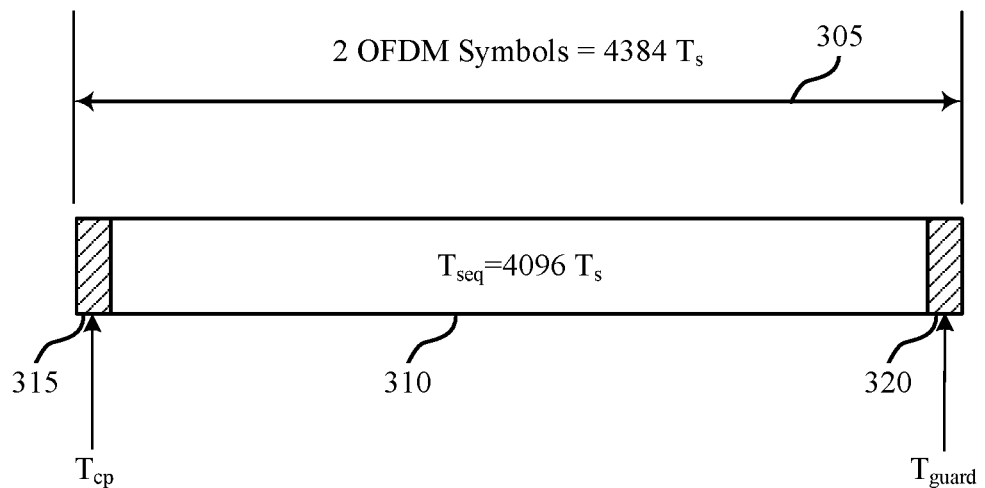
FIG. 3 illustrates an example of a two-symbol transmission time interval (TTI) that supports SR techniques in wireless transmissions in accordance with aspects of the present disclosure.

FIG. 3 illustrates an example of a two-symbol TTI 300 that supports SR techniques in wireless transmissions in accordance with various aspects of the present disclosure. In some examples, two-symbol TTI 300 may implement aspects of wireless communication system 100. As discussed above, in some cases SR transmissions may be provided using two-symbol TTIs, using a portion of PRACH resources allocated in the two-symbol TTI. In some examples, a SR may be transmitted in a manner similar to existing legacy preamble format 4 structure in two OFDM symbols 305, in which a six RB transmission may be provided with a $T_{seq}$ 310, in which $T_{seq}=4096 \cdot T_s$, which implies sub carrier spacing of 7.5 kHz and up to 64 sequences. For preamble sequence generation, the sequence may be determined according to Equation (1) below:

$$x_u(n) = e^{-j\frac{\pi u n(n+1)}{N_{ZC}}}, 0 \le n \le N_{ZC} - 1 \quad (1)$$

where $N_{ZC}$ is the length of the Zadoff-Chu sequence and u is the chosen root of the Zadoff-Chu sequence.

In some cases, Cyclic shifts may be chosen based on a trade-off between capacity and performance, such as according to Equation (2) below:

$$x_{u,v}(n)=x_u((n+C_v) \bmod N_{ZC}) \text{ where } C_v=vN_{CS} \text{for } v=0, 1, \ldots, \lfloor N_{ZC}/N_{CS} \rfloor -1, N_{CS} \ne 0 \quad (2)$$

where $C_v$ is a cyclic shift of the Zadoff-Chu sequence and $N_{CS}$ is a set parameter that indicates or limits the set of possible cyclic shifts $C_v$. In some examples, $N_{CS}$ may be provided to a UE or base station via signaling and by implementing $N_{CS}$, increased performance in high doppler channels may be achieved at the expense of a lowered maximum capacity of the random access channel.

In some cases, waveform placement may be based on a choice of $T_{cp}$ 315 and $T_{guard}$ 320, wherein $T_{cp}$ is the duration of a CP and $T_{guard}$ is the duration of a guard period. The sum of $T_{cp}$ 315 and $T_{guard}$ 320 may be constrained to be less than $288 \cdot T_s$ based on a duration of two OFDM symbols 305. In such cases, PRACH functionality may be limited to near cell users. For example, for the case of $T_{guard}=144 \cdot T_s$, the supportable UE 115 to base station 105 distance would be about 700 meters.

Figure 4:
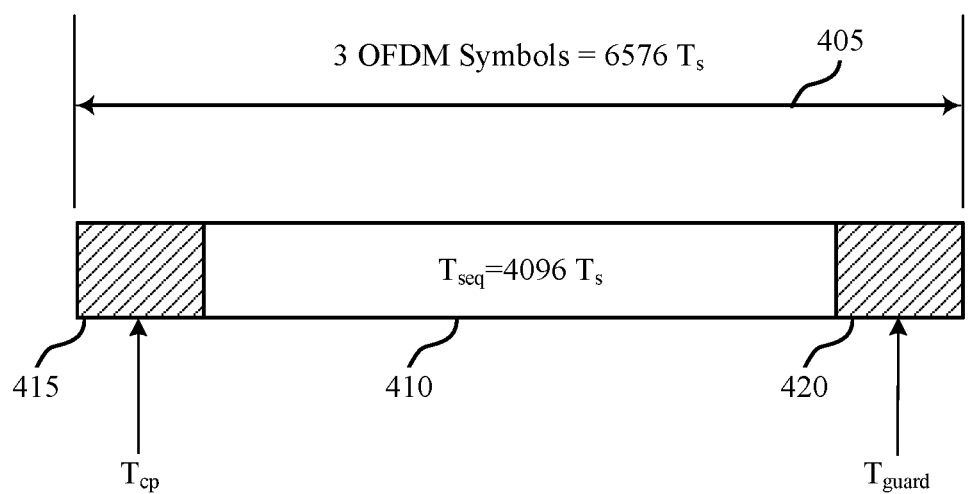
FIG. 4 illustrates an example of a three-symbol TTI that supports SR techniques in wireless transmissions in accordance with aspects of the present disclosure.

FIG. 4 illustrates an example of a three symbol TTI 400 that supports SR techniques in wireless transmissions in accordance with various aspects of the present disclosure. In some examples, three symbol TTI 400 may implement aspects of wireless communication system 100. As discussed above, in some cases SR transmissions may be provided using three-symbol TTIs, using a portion of PRACH resources allocated in the three-symbol TTI. In some examples, two TTIs in each 1 ms subframe may have a length of three OFDM symbols 405. For these TTIs, a larger cell radius can be supported. In some instances, for three OFDM symbols 405 the $T_{seq}$ 410 waveform may be $4096 \cdot T_s$, the same as two-symbol case, and may span three symbols with $T_{cp}$ 415 plus $T_{guard}$ 420 being $2624 \cdot T_s$. Relative to the two-symbol case, the CP and guard length increases may support larger cell sizes. For example, in the case of $T_{guard}$ 420 having a duration of $1312 \cdot T_s$, the maximum UE to base station distance is about 6.7 km. For UEs where the base station to UE distance exceeds this amount, they can revert to using legacy 1 ms PRACH transmissions.

In some cases, such a determination may be based on a timing advance (TA) of the UE. If the base station is given the UE TA value, it may make a determination as to whether shortened PRACH or legacy 1 ms PRACH is to be configured for a given UE. In some examples, a TA value above a threshold value may be used to determine which random access resources are to be used by a UE to transmit SR transmissions. In some instances, a three-symbol TTI may have a sounding reference signal (SRS) transmission in a last symbol of the TTI. In such cases, even though the TTI is a three symbol TTI, the first two symbols can be converted to use the two-symbol PRACH allocation and the last symbol is configured as SRS.

Figure 5:
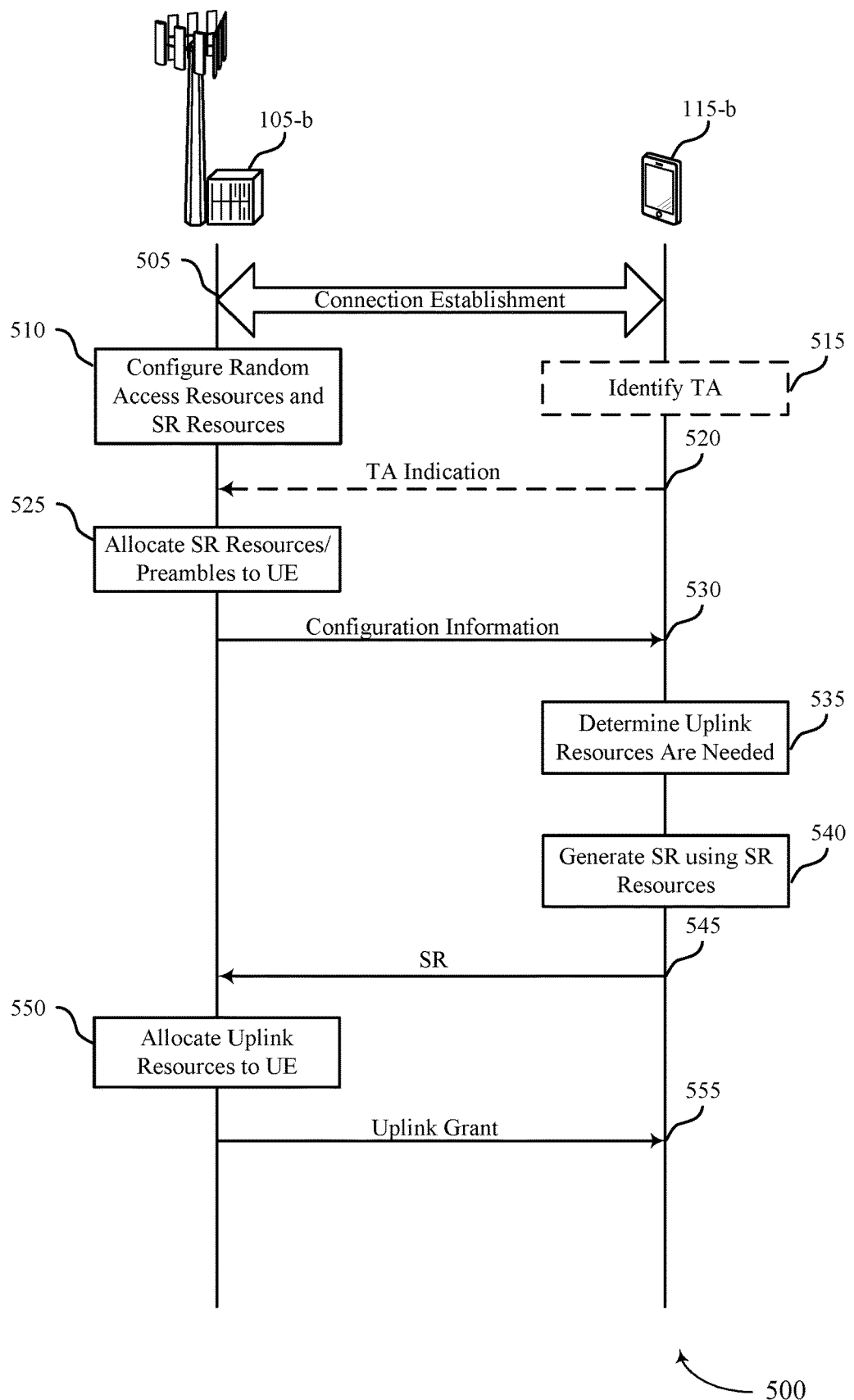
FIG. 5 illustrates an example of a process flow that supports SR techniques in wireless transmissions in accordance with aspects of the present disclosure.

FIG. 5 illustrates an example of a process flow 500 that supports SR techniques in wireless transmissions in accordance with various aspects of the present disclosure. Process flow 500 may include a base station 105-*b*, and a UE 115-*b*, which may be examples of the corresponding devices described with reference to FIGS. 1 and 2. The base station 105-*b* and the UE 115-*b* may establish a connection 505 according to established connection establishment techniques for the wireless communications system.

At block 510, the base station 105-*b* may configure random access resources and SR resources. As discussed above, in some cases base station 105-*b* may configure PRACH resources within certain TTIs to allow UE 115-*b* to transmit random access requests. In some examples, the PRACH resources may be allocated such that a first portion of the resource may be allocated for SR transmissions and a second portion of the resources may be allocated for random access transmissions. In some instances, certain preamble signatures may be identified for SR and random access transmissions.

At optional block 515, the UE 115-*b* may identify its TA. The UE 115-*b* may in some cases, determine its TA according to established techniques for TA determination, such as based on a round trip time for transmissions between the UE 115-*b* and base station 105-*b*. The UE 115-may transmit a TA indication 520 to the base station 105-*b*.

At block 525, the base station 105-*b* may allocate SR resources and/or preamble signatures to the UE 115-*b*. In some cases, the SR resources may be allocated based at least in part on the TA value for the UE 115-*b*, and a distance between the UE 115-*b* and the base station 105-*b*. In some examples, SR resources may be allocated based at least in part on a loading of the base station 105-*b* and how many other users may be present that may need random access resources. In further cases, the base station 105-*b* may identify a likelihood of the UE 115-*b* transmitting a SR, and may allocate SR resources based at least in part on the likelihood of such a SR transmission. For instance, if the UE 115-*b* is a MTC device that has relatively few transmissions, the base station 105-*b* may allocate SR resources that overlap with one or more other UEs, or may assign UE 115-*b* a cyclic shift that is closely spaced with other cyclic shifts, or may assign UE 115-*b* signatures that have been assigned as contention-based. The base station 105-*b* may transmit configuration information 530 to the UE 115-*b* that may indicate the SR resources. Such configuration information 530 may be transmitted using, for example, RRC signaling. In some aspects, the configuration information 530 may include a periodicity function or a bitmap that may indicate PRACH resources and SR resources within the PRACH resources.

At block 535, the UE 115-*b* may determine that uplink resources are needed. For example, the UE 115-*b* may receive data from an application running at the UE 115-*b* that is to be transmitted in an uplink transmission, and for which the UE 115-*b* has not been allocated resources. In some cases, as discussed above, if the UE 115-*b* also have HARQ ACK/NACK feedback to transmit, the SR may be transmitted using PUCCH resources associated with the HARQ feedback. In cases where the UE 115-*b* does not have ACK/NACK to transmit, SR resources within the random access resources may be used for the SR transmission. At block 540, the UE 115-*b* may generate the SR using the SR resources, and may transmit the SR 545 to the base station 105-*b*.

The base station 105-*b* may receive the SR 545, and at block 550 may allocate uplink resources to the UE 115-*b* for uplink transmissions. The allocated uplink resources may be provided to the UE 115-*b* in an uplink grant 555 that may be transmitted to the UE 115-*b*.

Figure 6:
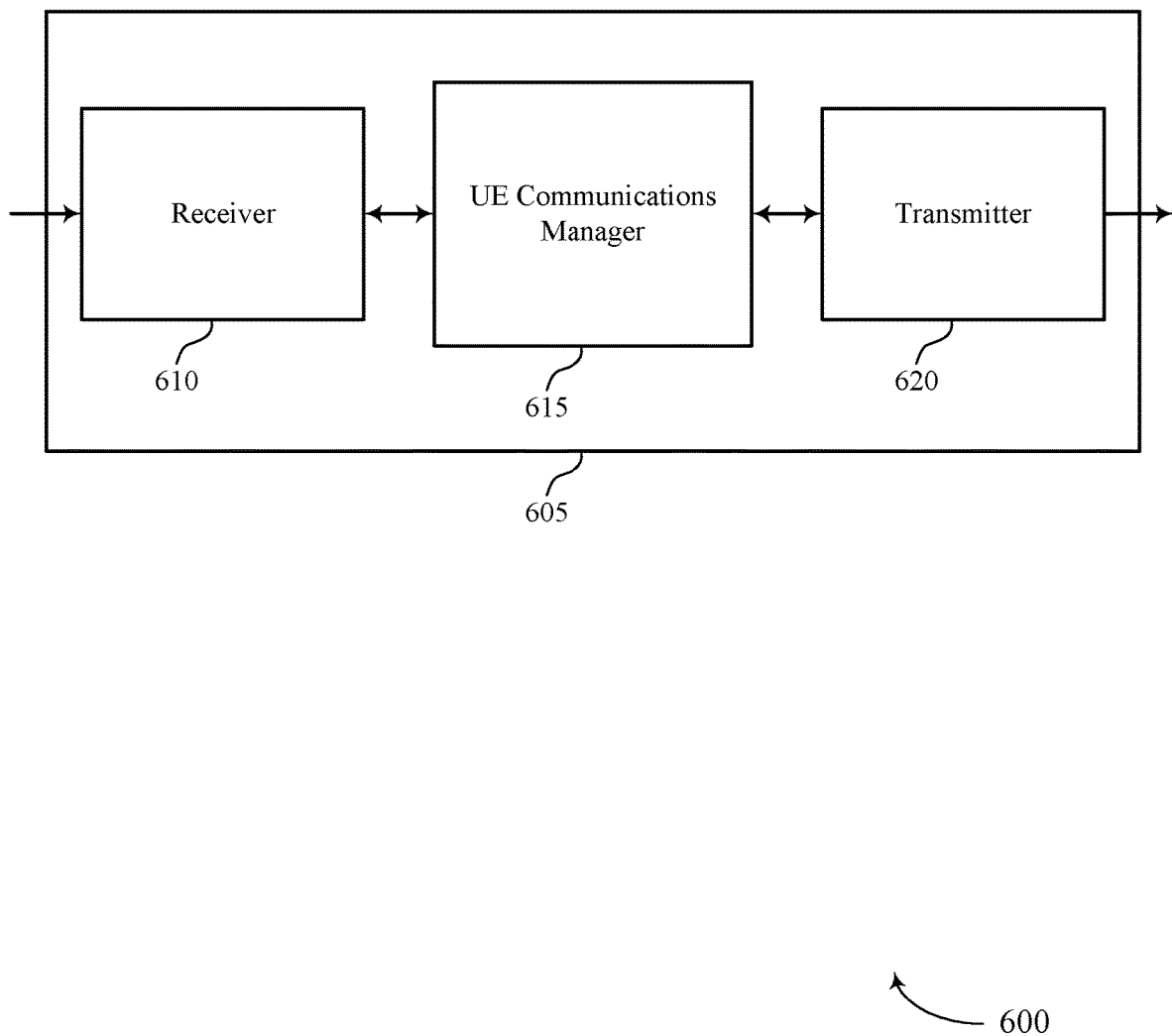
FIGS. 6 through 8 show block diagrams of a device that supports SR techniques in wireless transmissions in accordance with aspects of the present disclosure.

FIG. 6 shows a block diagram 600 of a wireless device 605 that supports SR techniques in wireless transmissions in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to SR techniques in wireless transmissions). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify first random access resources within a first duration TTI and second random access resources within a second duration TTI, where the first duration TTI is shorter than the second duration TTI, generate a SR using resources allocated for SRs within the first random access resources, and transmit the SR.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
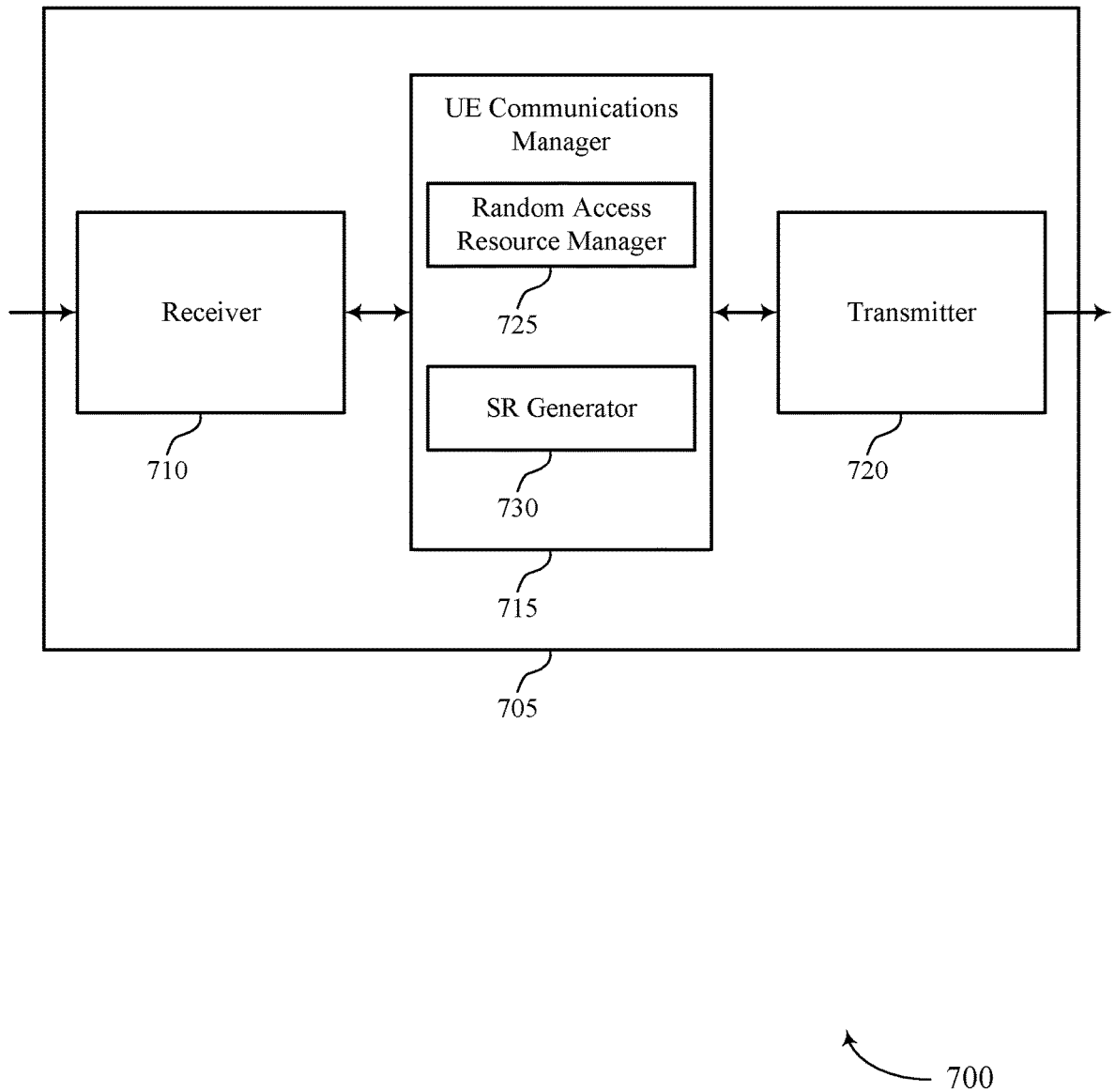

FIG. 7 shows a block diagram 700 of a wireless device 705 that supports SR techniques in wireless transmissions in accordance with aspects of the present disclosure. Wireless device 705 may be an example of aspects of a wireless device 605 or a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to SR techniques in wireless transmissions). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include random access resource manager 725 and SR generator 730.

Random access resource manager 725 may identify first random access resources within a first duration TTI and second random access resources within a second duration TTI, where the first duration TTI is shorter than the second duration TTI. In some cases, the random access resources may include a cyclic shift that is received in RRC signaling from a base station. In some examples, the random access resource manager 725 may identify which of a set of first duration TTIs include the first random access resources based on configuration information received from a base station, which may include a subset of available preamble signatures associated with the first random access resources. In some examples, the first random access resources may be identified according to a two-OFDM symbol TTI configuration rather than a three-OFDM symbol TTI configuration. In some instances, the first random access resources include a first subset of resources corresponding to the resources allocated for SRs and a second subset of resources allocated for random access requests. In some aspects, the configuration information includes one or more of a periodicity function or a bitmap for determining which of the set of first duration TTIs include the first random access resources. In some instances, the first duration TTI spans three OFDM symbols, and it may be determined that a reference signal is to be transmitted in a last OFDM symbol of the first duration TTI, and the remaining two OFDM symbols used to determine SR resources.

SR generator 730 may generate a SR using resources allocated for SRs within the first random access resources, and transmit the SR. In some cases, SR generator 730 may generate a second SR using second random access resources within the second duration TTI, and generate the second SR using resources within a control channel allocated for the feedback transmission. In some examples, the second duration TTI corresponds to a one millisecond TTI duration.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
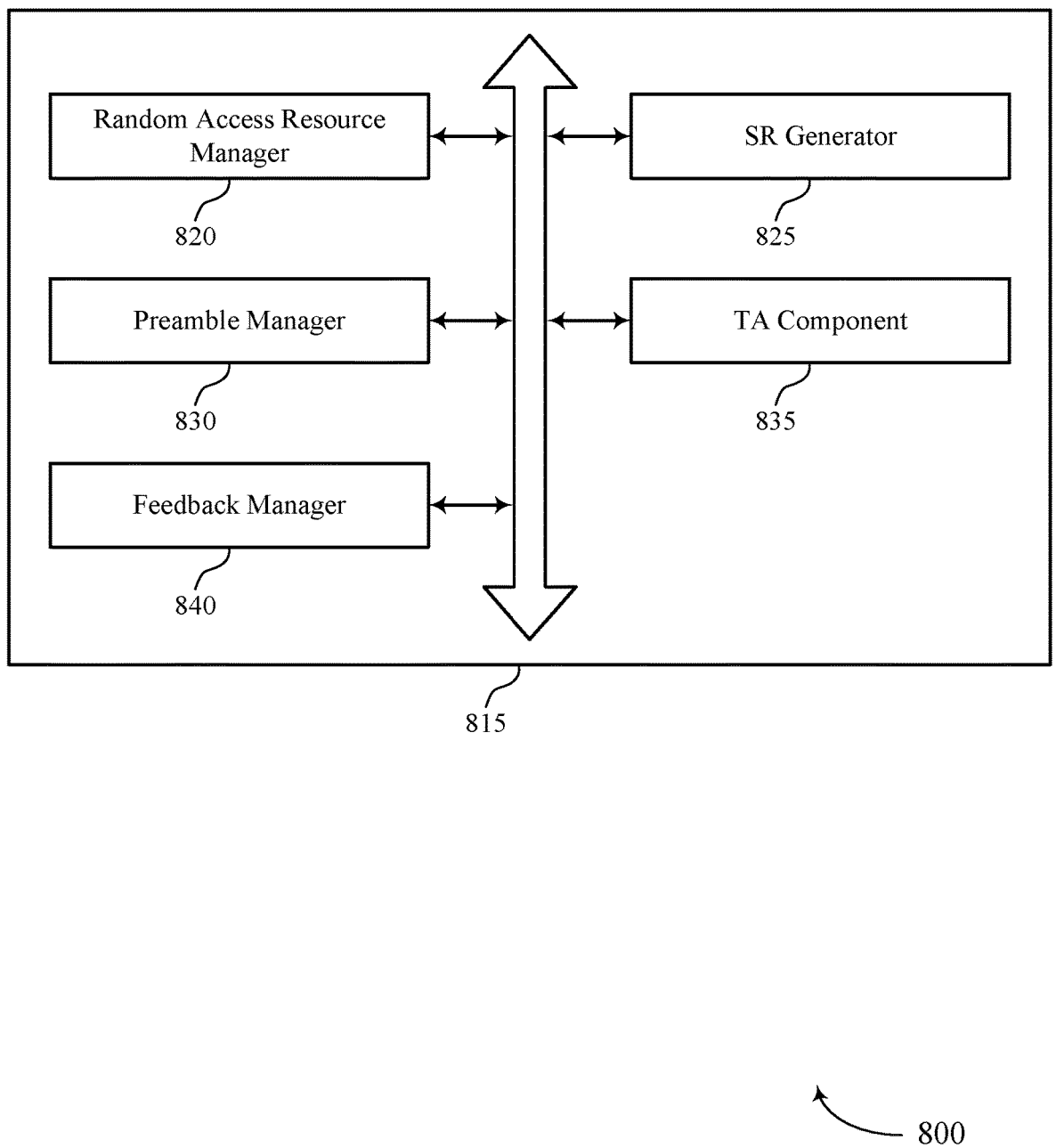

FIG. 8 shows a block diagram 800 of a UE communications manager 815 that supports SR techniques in wireless transmissions in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include random access resource manager 820, SR generator 825, preamble manager 830, TA component 835, and feedback manager 840. Each of these modules may communicate, directly or indirectly, with one another (e.g., via one or more buses).

Random access resource manager 820 may identify first random access resources within a first duration TTI and second random access resources within a second duration TTI, where the first duration TTI is shorter than the second duration TTI. In some cases, the random access resources may include a cyclic shift that is received in RRC signaling from a base station. In some examples, the random access resource manager 820 may identify which of a set of first duration TTIs include the first random access resources based on configuration information received from a base station, which may include a subset of available preamble signatures associated with the first random access resources. In some instances, the first random access resources may be identified according to a two-OFDM symbol TTI configuration rather than a three-OFDM symbol TTI configuration. In some aspects, the first random access resources include a first subset of resources corresponding to the resources allocated for SRs and a second subset of resources allocated for random access requests. In some examples, the configuration information includes one or more of a periodicity function or a bitmap for determining which of the set of first duration TTIs include the first random access resources. In some examples, the first duration TTI spans three OFDM symbols, and it may be determined that a reference signal is to be transmitted in a last OFDM symbol of the first duration TTI, and the remaining two OFDM symbols used to determine SR resources.

SR generator 825 may generate a SR using resources allocated for SRs within the first random access resources, and transmit the SR. In some cases, SR generator 825 may generate a second SR using second random access resources within the second duration TTI, and generate the second SR using resources within a control channel allocated for the feedback transmission. In some examples, the second duration TTI corresponds to a one millisecond TTI duration.

Preamble manager 830 may generate a preamble for the SR transmission. In some cases, the first subset of resources include a first subset of random access preamble signatures for transmitting SRs and the second subset of resources include a second subset of random access preamble signatures for transmitting random access requests. In some examples, the first subset of resources and the second subset of resources are time-varying across a set of first duration TTIs. In some examples, the second subset of resources is split to include contention-based resources and contention-free resources. In some aspects, the first random access resources include a set of available preamble signatures for a four-step random access procedure used for the SR. In some instances, the first random access resources include a first preamble signature for use in transmitting the SR, the first preamble signature selected based on a likelihood of signature usage. In some cases, one or more of a cyclic shift spacing between the first preamble signature and one or more other preamble signatures or a contention category of the first preamble signature is selected based on the likelihood of signature usage. In some examples, one or more of a cyclic shift spacing between the first preamble signature and one or more other preamble signatures or a contention category of the first preamble signature is selected based on a spatial separation of transmitters that may concurrently transmit using the first random access resources.

TA component 835 may determine a TA value for transmissions between a UE and a base station, and provide the TA value to the base station. The first duration TTI that includes the first random access resources may selected from two or more TTI durations that are shorter than the second duration TTI based on the TA, in some examples. In some cases, the two or more TTI durations include a two-symbol TTI duration and a three-symbol TTI duration, and the three-symbol TTI duration is selected responsive to the TA value exceeding a first threshold value. In some instances, it may be determined that the TA value exceeds a second threshold value, and a 1 ms TTI may be used for a SR transmission. Feedback manager 840 may determine that a feedback transmission is to be transmitted to the base station to indicate successful or unsuccessful reception of a received transmission. In some aspects, if a SR and feedback transmissions are both present, uplink control channel resources used for feedback transmissions may also be used for the SR transmission.

Figure 9:
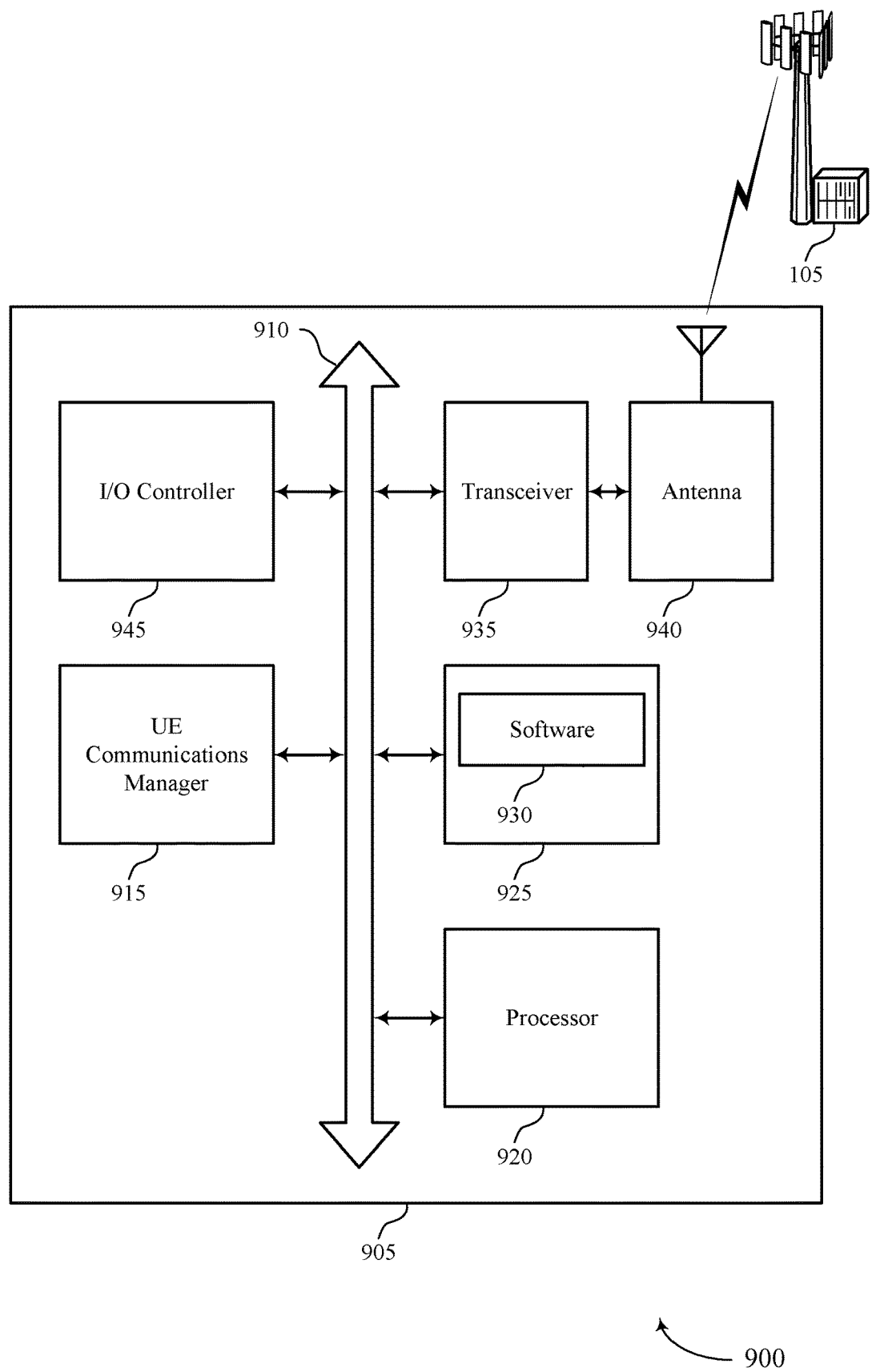
FIG. 9 illustrates a block diagram of a system including a user equipment (UE) that supports SR techniques in wireless transmissions in accordance with aspects of the present disclosure.

FIG. 9 shows a diagram of a system 900 including a device 905 that supports SR techniques in wireless transmissions in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, a FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting SR techniques in wireless transmissions).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support SR techniques in wireless transmissions. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some examples the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some examples, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some instances, I/O controller 945 may be implemented as part of a processor. In some aspects, a user may interact with device 905 via I/O controller 945 or via hardware components controlled by I/O controller 945.

Figure 10:
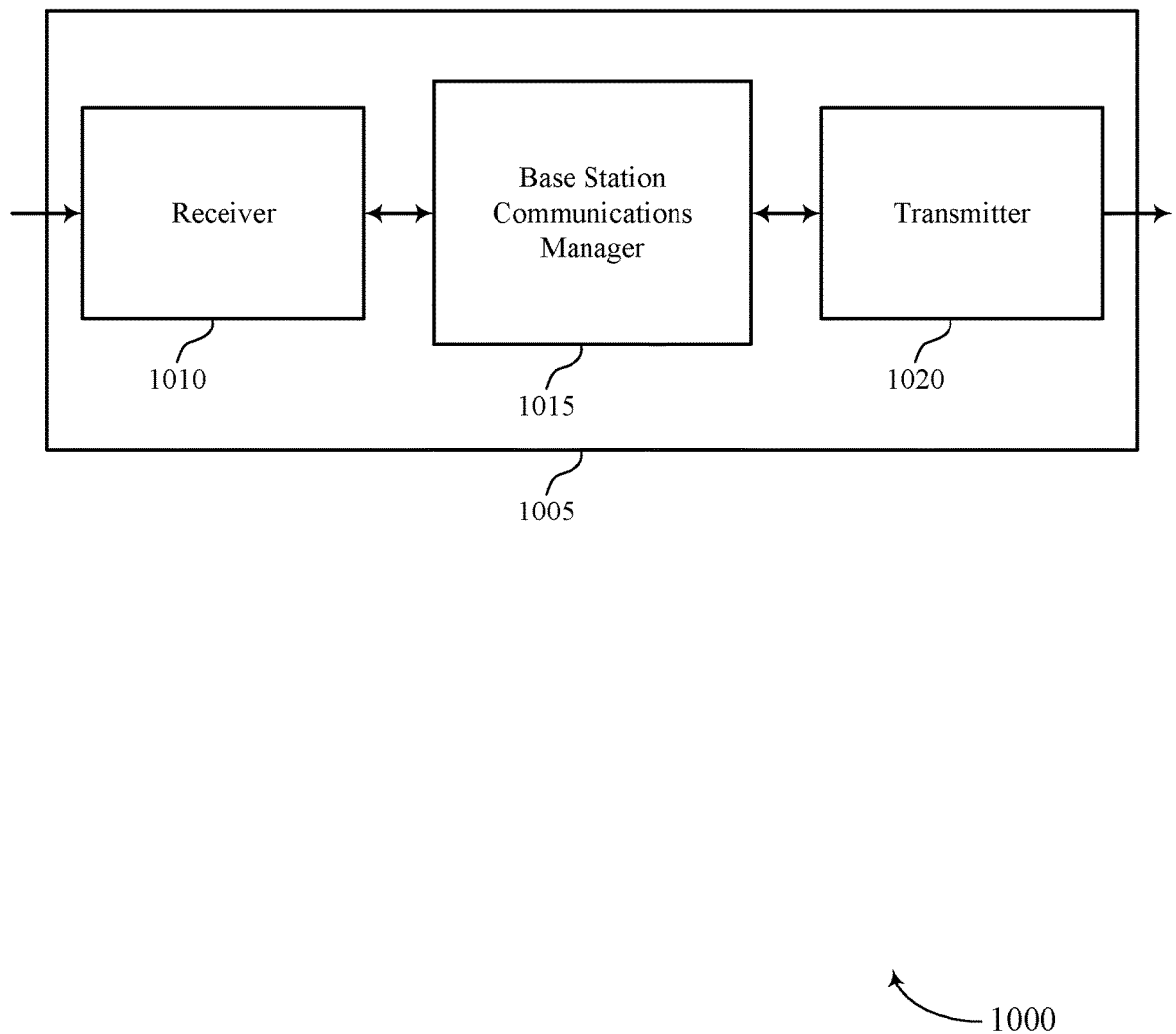
FIGS. 10 through 12 show block diagrams of a device that supports SR techniques in wireless transmissions in accordance with aspects of the present disclosure.

FIG. 10 shows a block diagram 1000 of a wireless device 1005 that supports SR techniques in wireless transmissions in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to SR techniques in wireless transmissions). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify first random access resources within a first duration TTI and second random access resources within a second duration TTI, where the first duration TTI is shorter than the second duration TTI, allocate SR resources within the first random access resources for use by at least one UE, and receive a SR from the UE over the SR resources.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
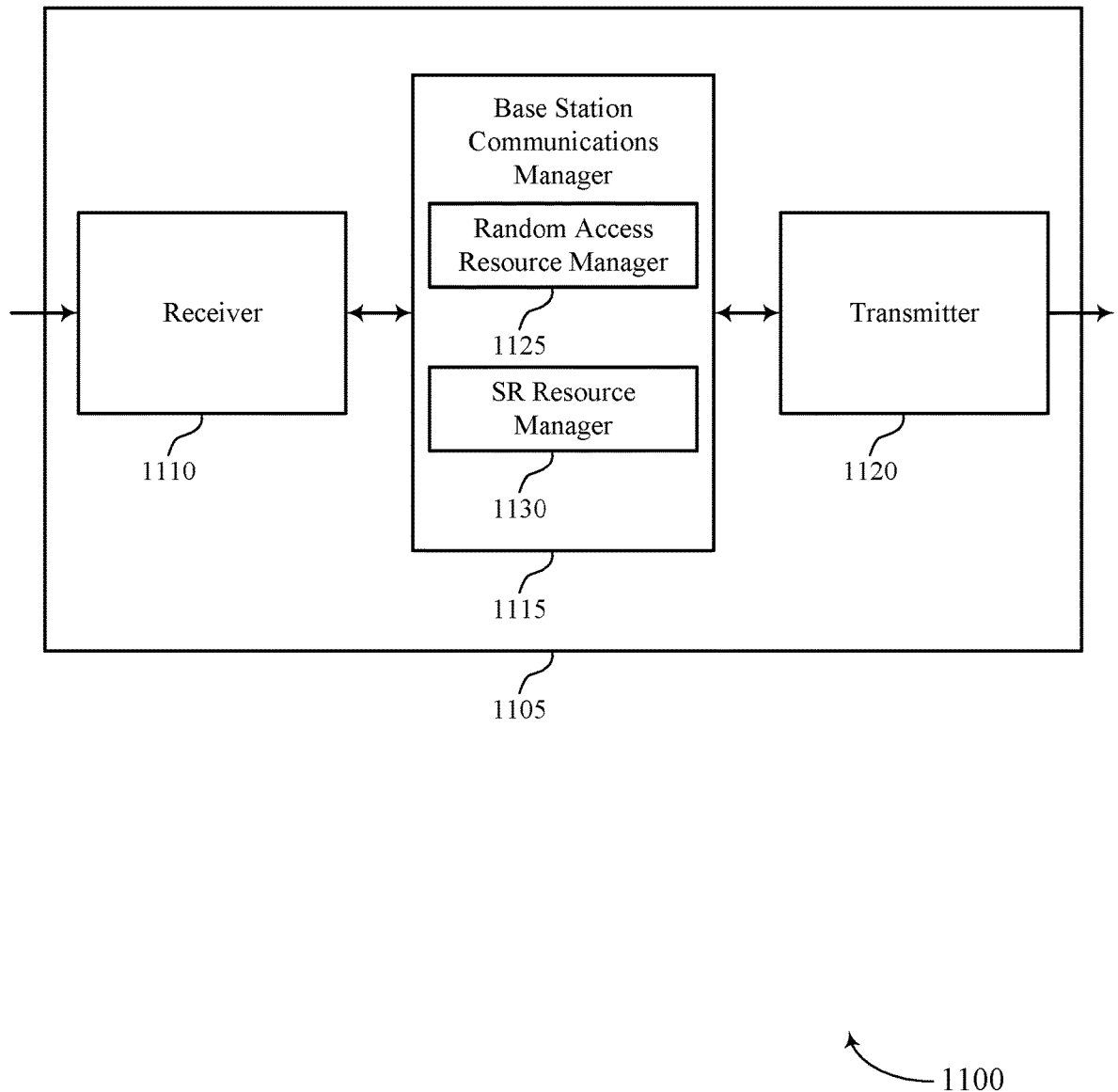

FIG. 11 shows a block diagram 1100 of a wireless device 1105 that supports SR techniques in wireless transmissions in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to SR techniques in wireless transmissions). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include random access resource manager 1125 and SR resource manager 1130.

Random access resource manager 1125 may identify first random access resources within a first duration TTI and second random access resources within a second duration TTI, where the first duration TTI is shorter than the second duration TTI. In some cases, the first random access resources include a first subset of resources for use in transmitting SRs and a second subset of resources for use in transmitting random access requests. In some examples, the first subset of resources include a first subset of random access preamble signatures for transmitting SRs and the second subset of resources include a second subset of random access preamble signatures for transmitting random access requests. In some instances, the first subset of resources and the second subset of resources are time-varying across a set of first duration TTIs. In some aspects, the second subset of resources is split to include contention-based resources and contention-free resources. In some examples, the first random access resources include a set of available preamble signatures for a four-step random access procedure used for the SR.

SR resource manager 1130 may allocate SR resources within the first random access resources for use by at least one UE. In some cases, SR resource manager 1130 may configure the UE to use the first set of random access resources rather than the second set of random access resources in a three OFDM symbol TTI when a periodic reference signal is to be transmitted in a last OFDM symbol of the three OFDM symbol TTI, configure the UE to transmit SRs using a control channel allocated for feedback transmission when the UE has a feedback transmission to be transmitted along with the SR, and receive a SR from the UE over the SR resources. In some examples, the SR resources include a cyclic shift for use when transmitting the SR. In some instances, the allocating further includes: configuring one or more of a periodicity function or a bitmap at the UE to determine which of a set of first duration TTIs include the first random access resources. In some aspects, the first random access resources include a first preamble signature for use in transmitting the SR, the first preamble signature selected based on a likelihood of signature usage. In some cases, one or more of a cyclic shift spacing between the first preamble signature and one or more other preamble signatures or a contention category of the first preamble signature is selected based on the likelihood of signature usage. In some examples, one or more of a cyclic shift spacing between the first preamble signature and one or more other preamble signatures or a contention category of the first preamble signature is selected based on a spatial separation of UEs that may concurrently transmit using the first random access resources. In some instances, the allocating further includes: configuring a first set of random access resources for TTIs having a duration of two orthogonal frequency division multiplexing (OFDM) symbols and a second set of random access resources for TTIs having a duration of three OFDM symbols. In some aspects, the SR resources include a subset of available preamble signatures associated with the first random access resources.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
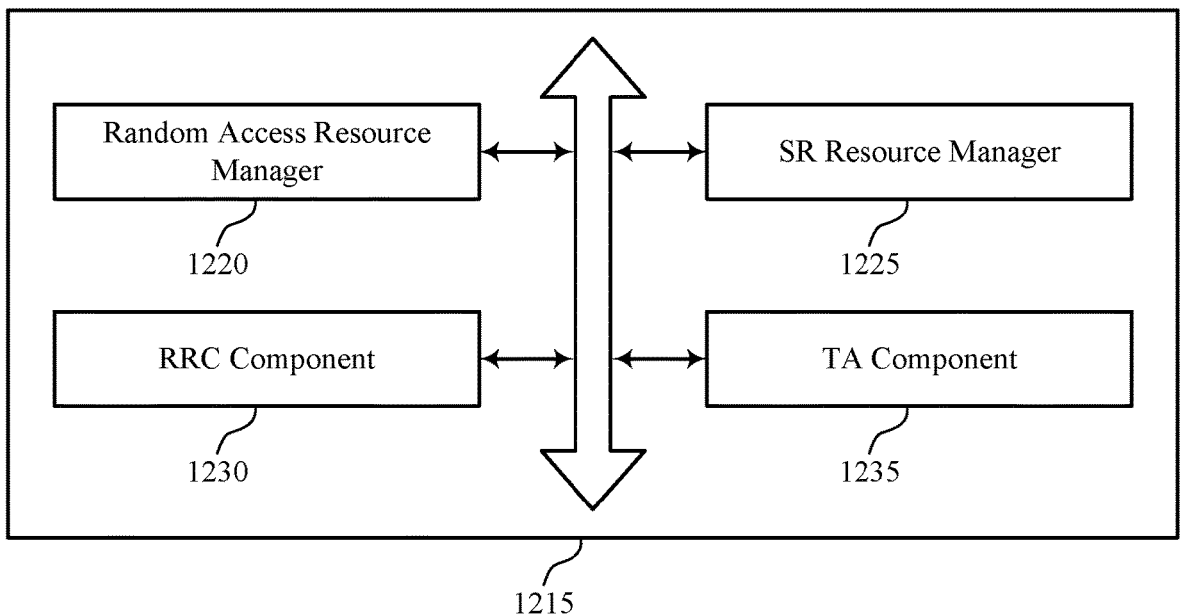

FIG. 12 shows a block diagram 1200 of a base station communications manager 1215 that supports SR techniques in wireless transmissions in accordance with aspects of the present disclosure. The base station communications manager 1215 may be an example of aspects of a base station communications manager 1315 described with reference to FIGS. 10, 11, and 13. The base station communications manager 1215 may include random access resource manager 1220, SR resource manager 1225, RRC component 1230, and TA component 1235. Each of these modules may communicate, directly or indirectly, with one another (e.g., via one or more buses).

Random access resource manager 1220 may identify first random access resources within a first duration TTI and second random access resources within a second duration TTI, where the first duration TTI is shorter than the second duration TTI. In some cases, the first random access resources include a first subset of resources for use in transmitting SRs and a second subset of resources for use in transmitting random access requests. In some examples, the first subset of resources include a first subset of random access preamble signatures for transmitting SRs and the second subset of resources include a second subset of random access preamble signatures for transmitting random access requests. In some instances, the first subset of resources and the second subset of resources are time-varying across a set of first duration TTIs. In some aspects, the second subset of resources is split to include contention-based resources and contention-free resources. In some cases, the first random access resources include a set of available preamble signatures for a four-step random access procedure used for the SR.

SR resource manager 1225 may allocate SR resources within the first random access resources for use by at least one UE. In some cases, SR resource manager 1225 may configure the UE to use the first set of random access resources rather than the second set of random access resources in a three OFDM symbol TTI when a periodic reference signal is to be transmitted in a last OFDM symbol of the three OFDM symbol TTI, configure the UE to transmit SRs using a control channel allocated for feedback transmission when the UE has a feedback transmission to be transmitted along with the SR, and receive a SR from the UE over the SR resources. In some examples, the SR resources include a cyclic shift for use when transmitting the SR. In some instances, the allocating further includes: configuring one or more of a periodicity function or a bitmap at the UE to determine which of a set of first duration TTIs include the first random access resources. In some aspects, the first random access resources include a first preamble signature for use in transmitting the SR, the first preamble signature selected based on a likelihood of signature usage. In some cases, one or more of a cyclic shift spacing between the first preamble signature and one or more other preamble signatures or a contention category of the first preamble signature is selected based on the likelihood of signature usage. In some examples, one or more of a cyclic shift spacing between the first preamble signature and one or more other preamble signatures or a contention category of the first preamble signature is selected based on a spatial separation of UEs that may concurrently transmit using the first random access resources. In some instances, the allocating further includes: configuring a first set of random access resources for TTIs having a duration of two OFDM symbols and a second set of random access resources for TTIs having a duration of three OFDM symbols. In some aspects, the SR resources include a subset of available preamble signatures associated with the first random access resources.

RRC component 1230 may transmit the cyclic shift to the UE using RRC signaling. TA component 1235 may receive a TA value for transmissions of the UE, select the first duration TTI from two or more TTI durations that are shorter than the second duration TTI based on the TA value, determine that the TA value exceeds a second threshold value, and configure the UE to use the second random access resources within the second duration TTI for SR transmissions. In some cases, the two or more TTI durations include a two-symbol TTI duration and a three-symbol TTI duration, and the three-symbol TTI duration is selected responsive to the TA value exceeding a first threshold value. In some examples, the second duration TTI corresponds to a one millisecond TTI duration.

Figure 13:
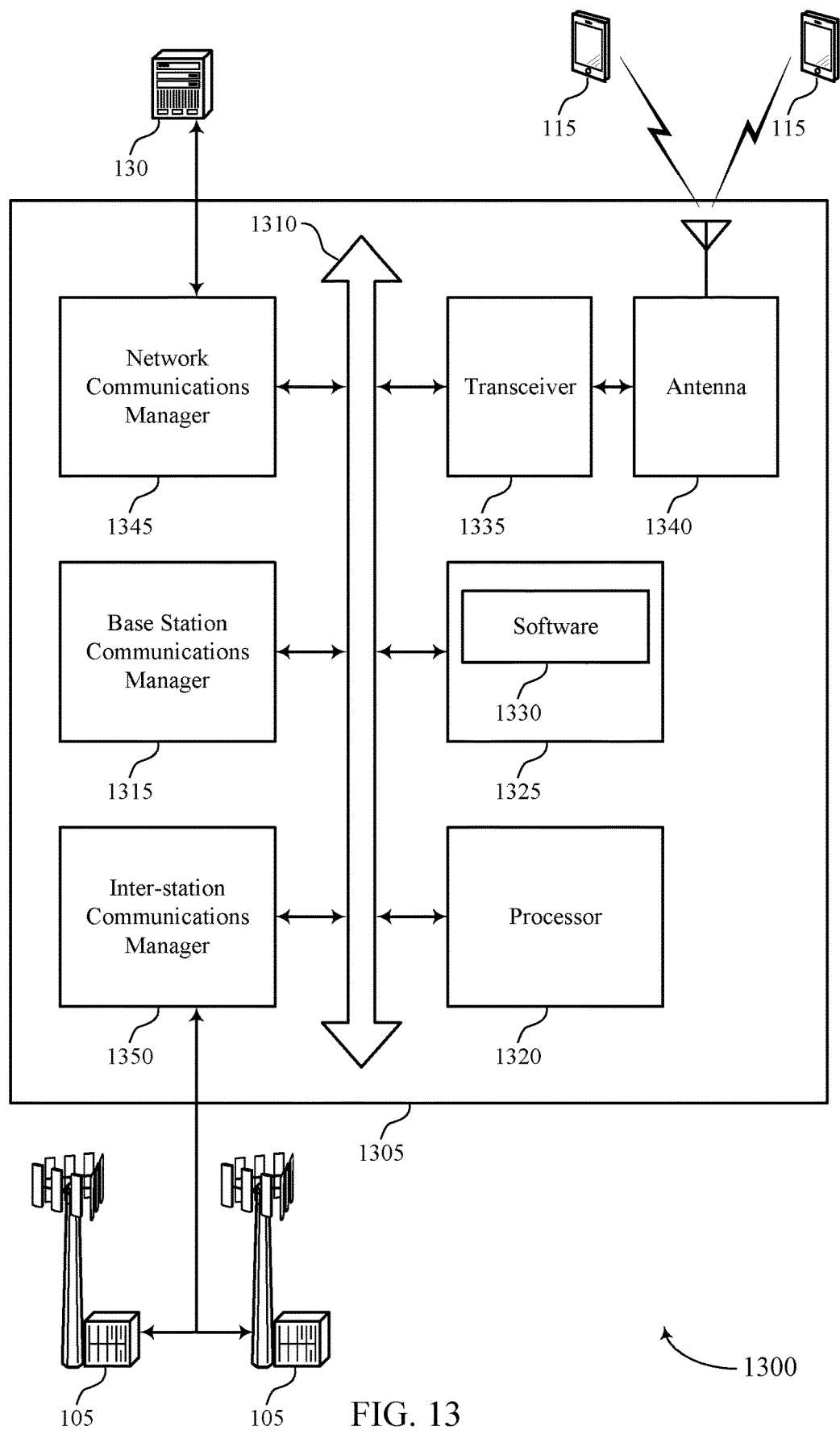
FIG. 13 illustrates a block diagram of a system including a base station that supports SR techniques in wireless transmissions in accordance with aspects of the present disclosure.

FIG. 13 shows a diagram of a system 1300 including a device 1305 that supports SR techniques in wireless transmissions in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting SR techniques in wireless transmissions).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support SR techniques in wireless transmissions. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some examples the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
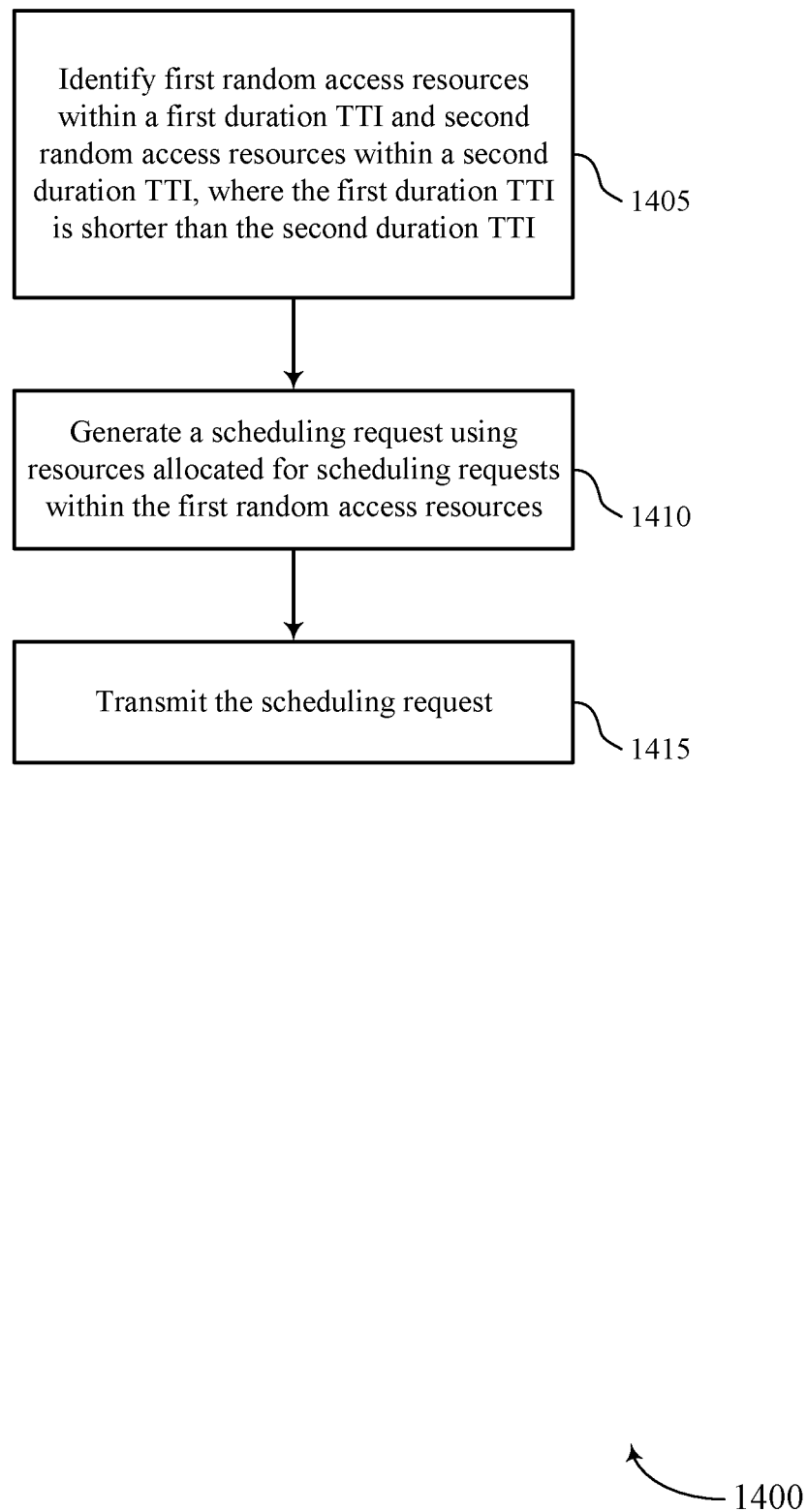
FIGS. 14 through 20 illustrate methods for SR techniques in wireless transmissions in accordance with aspects of the present disclosure.

FIG. 14 shows a flowchart illustrating a method 1400 for SR techniques in wireless transmissions in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify first random access resources within a first duration TTI and second random access resources within a second duration TTI, where the first duration TTI is shorter than the second duration TTI. The operations of block 1405 may be performed according to the methods described herein. In certain examples, aspects of the operations of block 1405 may be performed by a random access resource manager as described with reference to FIGS. 6 through 9.

At block 1410 the UE 115 may generate a SR using resources allocated for SRs within the first random access resources. The operations of block 1410 may be performed according to the methods described herein. In certain examples, aspects of the operations of block 1410 may be performed by a SR generator as described with reference to FIGS. 6 through 9.

At block 1415 the UE 115 may transmit the SR. The operations of block 1415 may be performed according to the methods described herein. In certain examples, aspects of the operations of block 1415 may be performed by a SR generator as described with reference to FIGS. 6 through 9.

Figure 15:
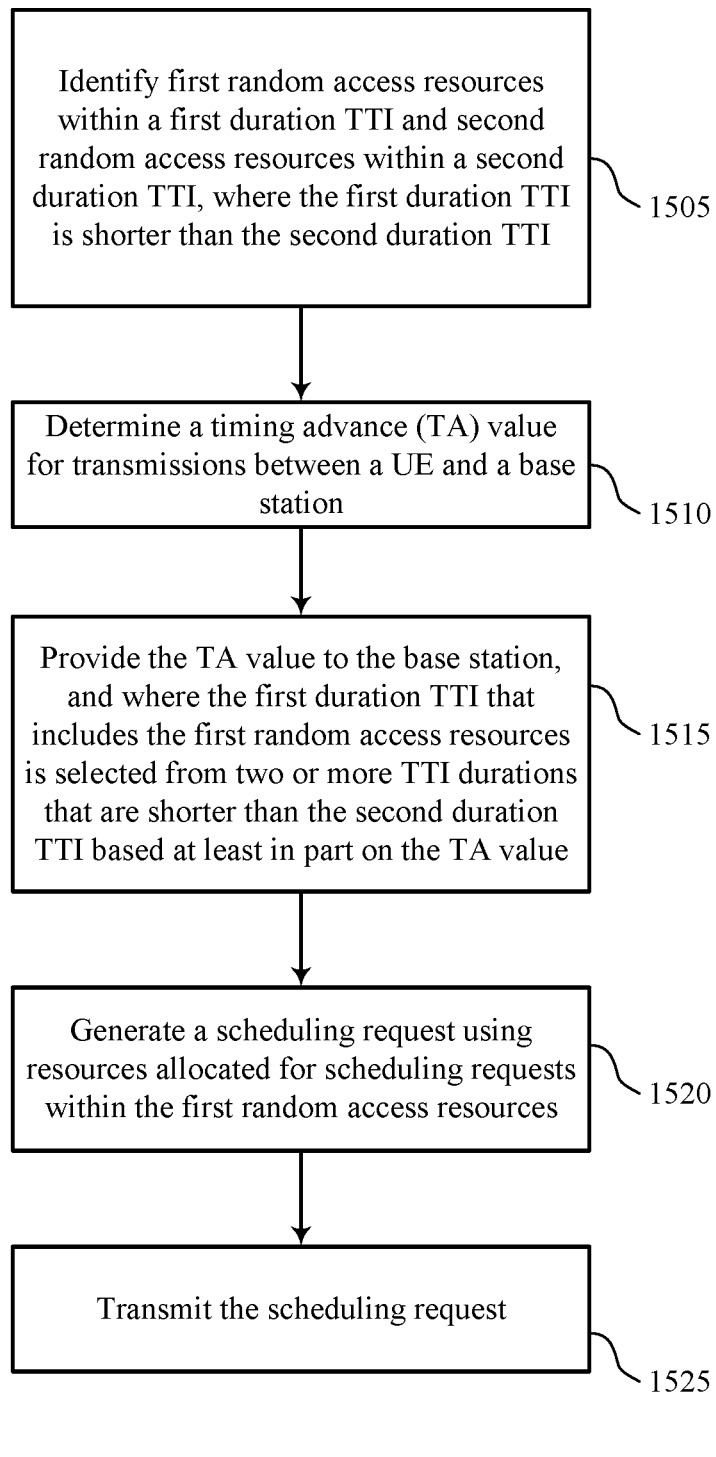

FIG. 15 shows a flowchart illustrating a method 1500 for SR techniques in wireless transmissions in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may identify first random access resources within a first duration TTI and second random access resources within a second duration TTI, where the first duration TTI is shorter than the second duration TTI. The operations of block 1505 may be performed according to the methods described herein. In certain examples, aspects of the operations of block 1505 may be performed by a random access resource manager as described with reference to FIGS. 6 through 9.

At block 1510 the UE 115 may determine a TA value for transmissions between a UE and a base station. The operations of block 1510 may be performed according to the methods described herein. In certain examples, aspects of the operations of block 1510 may be performed by a TA component as described with reference to FIGS. 6 through 9.

At block 1515 the UE 115 may provide the TA value to the base station, and where the first duration TTI that includes the first random access resources is selected from two or more TTI durations that are shorter than the second duration TTI based at least in part on the TA value. The operations of block 1515 may be performed according to the methods described herein. In certain examples, aspects of the operations of block 1515 may be performed by a TA component as described with reference to FIGS. 6 through 9.

At block 1520 the UE 115 may generate a SR using resources allocated for SRs within the first random access resources. The operations of block 1520 may be performed according to the methods described herein. In certain examples, aspects of the operations of block 1520 may be performed by a SR generator as described with reference to FIGS. 6 through 9.

At block 1525 the UE 115 may transmit the SR. The operations of block 1525 may be performed according to the methods described herein. In certain examples, aspects of the operations of block 1525 may be performed by a SR generator as described with reference to FIGS. 6 through 9.

Figure 16:
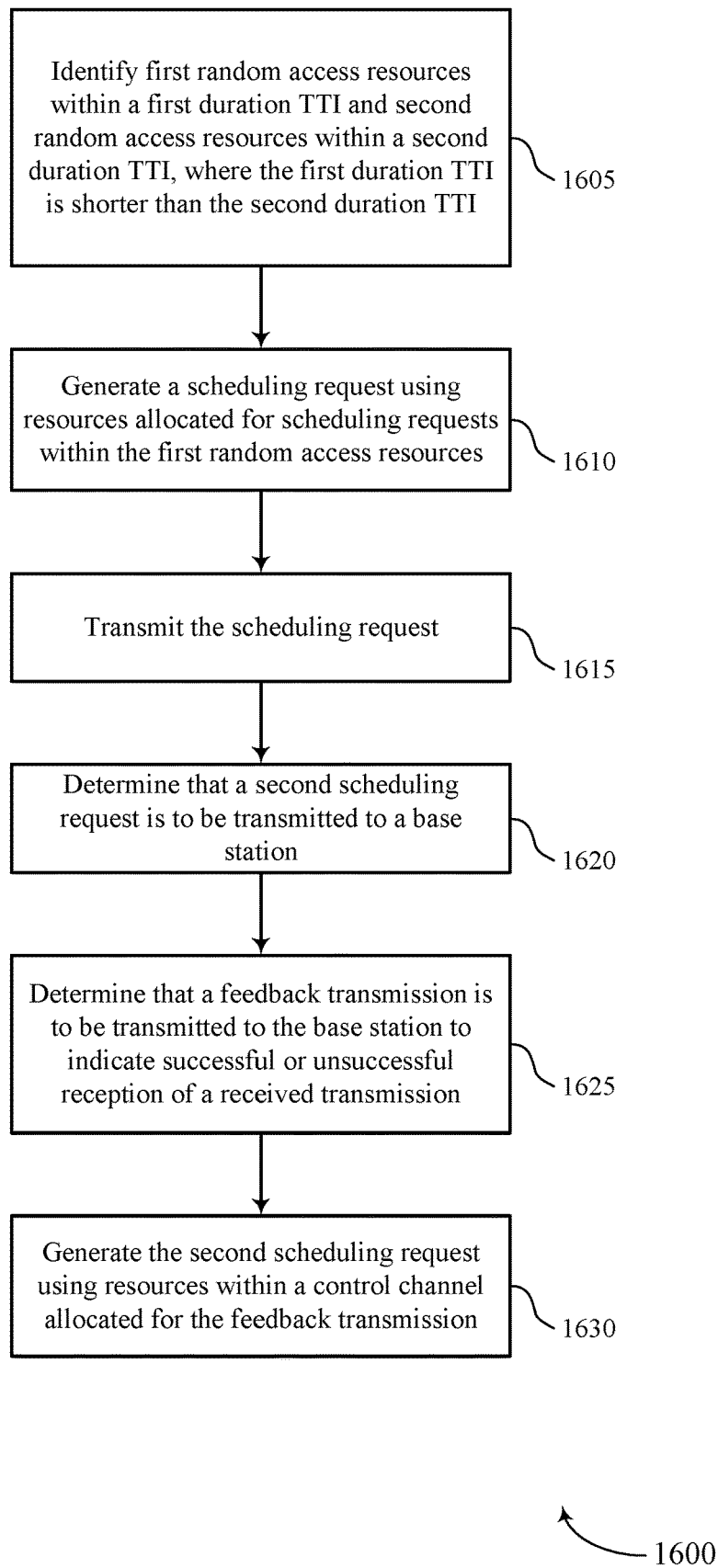

FIG. 16 shows a flowchart illustrating a method 1600 for SR techniques in wireless transmissions in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify first random access resources within a first duration TTI and second random access resources within a second duration TTI, where the first duration TTI is shorter than the second duration TTI. The operations of block 1605 may be performed according to the methods described herein. In certain examples, aspects of the operations of block 1605 may be performed by a random access resource manager as described with reference to FIGS. 6 through 9.

At block 1610 the UE 115 may generate a SR using resources allocated for SRs within the first random access resources. The operations of block 1610 may be performed according to the methods described herein. In certain examples, aspects of the operations of block 1610 may be performed by a SR generator as described with reference to FIGS. 6 through 9.

At block 1615 the UE 115 may transmit the SR. The operations of block 1615 may be performed according to the methods described herein. In certain examples, aspects of the operations of block 1615 may be performed by a SR generator as described with reference to FIGS. 6 through 9.

At block 1620 the UE 115 may determine that a second SR is to be transmitted to a base station. The operations of block 1620 may be performed according to the methods described herein. In certain examples, aspects of the operations of block 1620 may be performed by a SR generator as described with reference to FIGS. 6 through 9.

At block 1625 the UE 115 may determine that a feedback transmission is to be transmitted to the base station to indicate successful or unsuccessful reception of a received transmission. The operations of block 1625 may be performed according to the methods described herein. In certain examples, aspects of the operations of block 1625 may be performed by a feedback manager as described with reference to FIGS. 6 through 9.

At block 1630 the UE 115 may generate the second SR using resources within a control channel allocated for the feedback transmission. The operations of block 1630 may be performed according to the methods described herein. In certain examples, aspects of the operations of block 1630 may be performed by a SR generator as described with reference to FIGS. 6 through 9.

Figure 17:
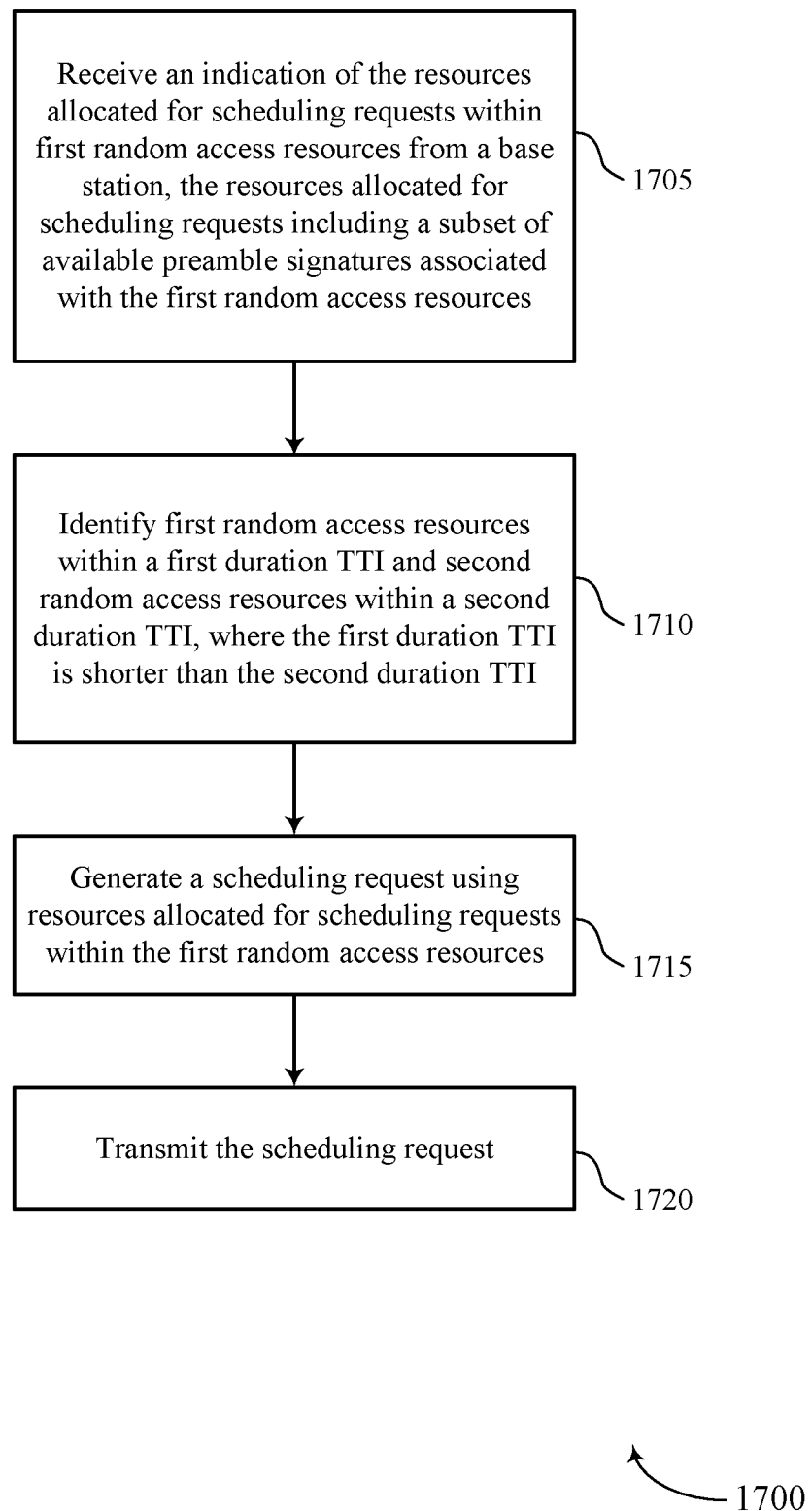

FIG. 17 shows a flowchart illustrating a method 1700 for SR techniques in wireless transmissions in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive an indication of the resources allocated for SRs within first random access resources from a base station, the resources allocated for SRs comprising a subset of available preamble signatures associated with the first random access resources. The operations of block 1705 may be performed according to the methods described herein. In certain examples, aspects of the operations of block 1705 may be performed by a random access resource manager as described with reference to FIGS. 6 through 9.

At block 1710 the UE 115 may identify first random access resources within a first duration TTI and second random access resources within a second duration TTI, where the first duration TTI is shorter than the second duration TTI. The operations of block 1710 may be performed according to the methods described herein. In certain examples, aspects of the operations of block 1710 may be performed by a random access resource manager as described with reference to FIGS. 6 through 9.

At block 1715 the UE 115 may generate a SR using resources allocated for SRs within the first random access resources. The operations of block 1715 may be performed according to the methods described herein. In certain examples, aspects of the operations of block 1715 may be performed by a SR generator as described with reference to FIGS. 6 through 9.

At block 1720 the UE 115 may transmit the SR. The operations of block 1720 may be performed according to the methods described herein. In certain examples, aspects of the operations of block 1720 may be performed by a SR generator as described with reference to FIGS. 6 through 9.

Figure 18:
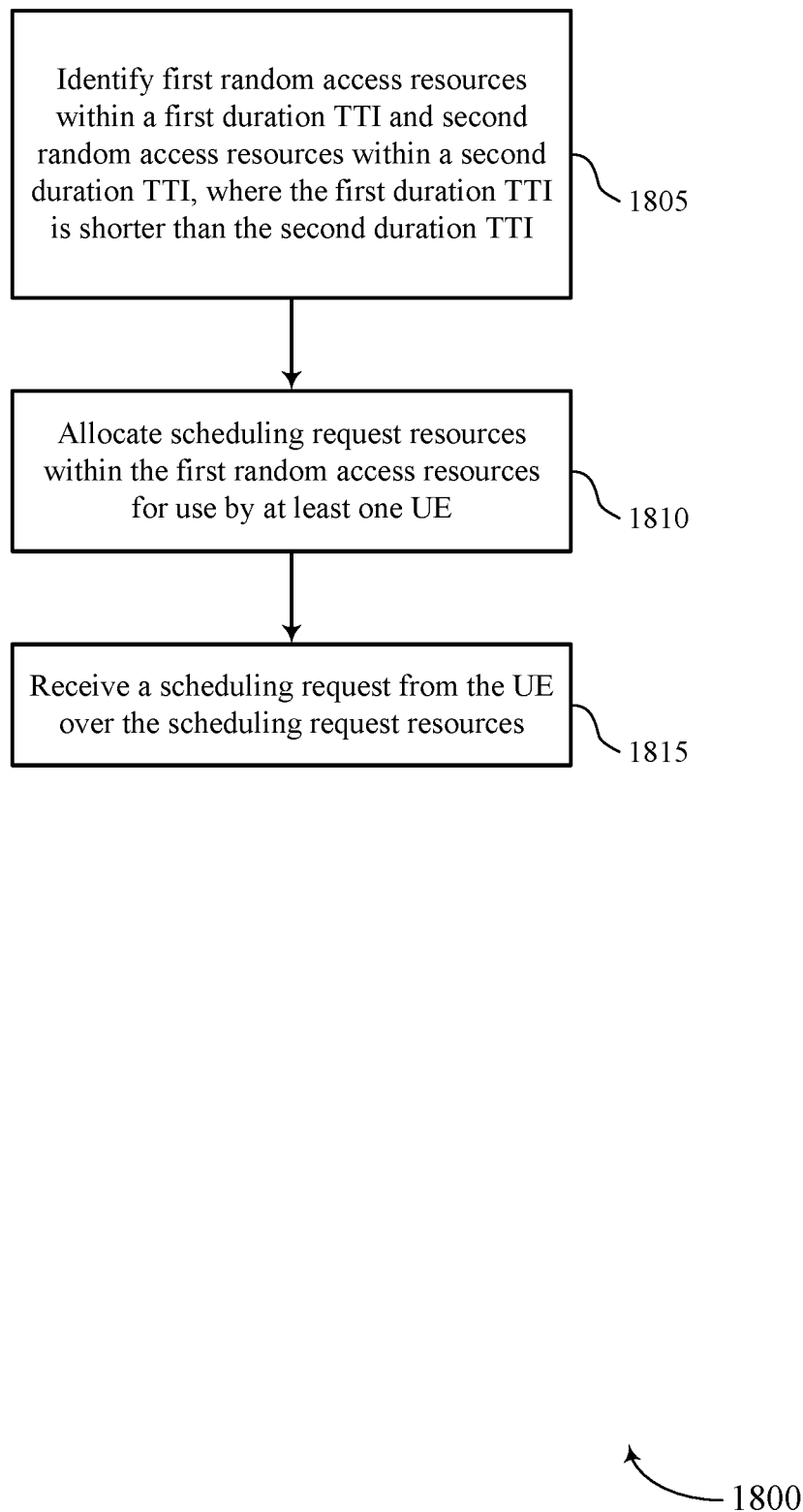

FIG. 18 shows a flowchart illustrating a method 1800 for SR techniques in wireless transmissions in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify first random access resources within a first duration TTI and second random access resources within a second duration TTI, where the first duration TTI is shorter than the second duration TTI. The operations of block 1805 may be performed according to the methods described herein. In certain examples, aspects of the operations of block 1805 may be performed by a random access resource manager as described with reference to FIGS. 10 through 13.

At block 1810 the base station 105 may allocate SR resources within the first random access resources for use by at least one UE. The operations of block 1810 may be performed according to the methods described herein. In certain examples, aspects of the operations of block 1810 may be performed by a SR resource manager as described with reference to FIGS. 10 through 13.

At block 1815 the base station 105 may receive a SR from the UE over the SR resources. The operations of block 1815 may be performed according to the methods described herein. In certain examples, aspects of the operations of block 1815 may be performed by a SR resource manager as described with reference to FIGS. 10 through 13.

Figure 19:
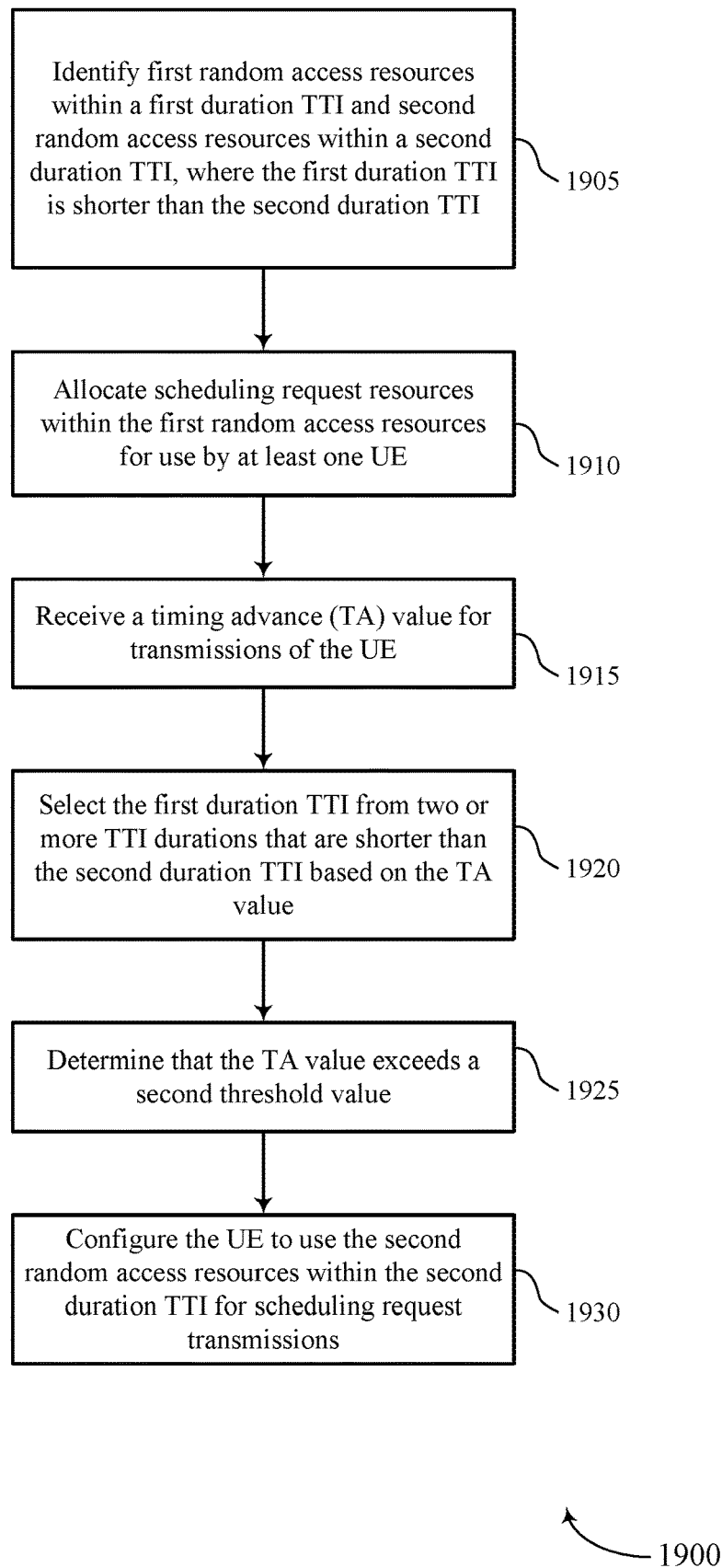

FIG. 19 shows a flowchart illustrating a method 1900 for SR techniques in wireless transmissions in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may identify first random access resources within a first duration TTI and second random access resources within a second duration TTI, where the first duration TTI is shorter than the second duration TTI. The operations of block 1905 may be performed according to the methods described herein. In certain examples, aspects of the operations of block 1905 may be performed by a random access resource manager as described with reference to FIGS. 10 through 13.

At block 1910 the base station 105 may allocate SR resources within the first random access resources for use by at least one UE. The operations of block 1910 may be performed according to the methods described herein. In certain examples, aspects of the operations of block 1910 may be performed by a SR resource manager as described with reference to FIGS. 10 through 13.

At block 1915 the base station 105 may receive a TA value for transmissions of the UE. The operations of block 1915 may be performed according to the methods described herein. In certain examples, aspects of the operations of block 1915 may be performed by a TA component as described with reference to FIGS. 10 through 13.

At block 1920 the base station 105 may select the first duration TTI from two or more TTI durations that are shorter than the second duration TTI based at least in part on the TA value. The operations of block 1920 may be performed according to the methods described herein. In certain examples, aspects of the operations of block 1920 may be performed by a TA component as described with reference to FIGS. 10 through 13.

At block 1925 the base station 105 may determine that the TA value exceeds a second threshold value. The operations of block 1925 may be performed according to the methods described herein. In certain examples, aspects of the operations of block 1925 may be performed by a TA component as described with reference to FIGS. 10 through 13.

At block 1930 the base station 105 may configure the UE to use the second random access resources within the second duration TTI for SR transmissions. The operations of block 1930 may be performed according to the methods described herein. In certain examples, aspects of the operations of block 1930 may be performed by a TA component as described with reference to FIGS. 10 through 13.

Figure 20:
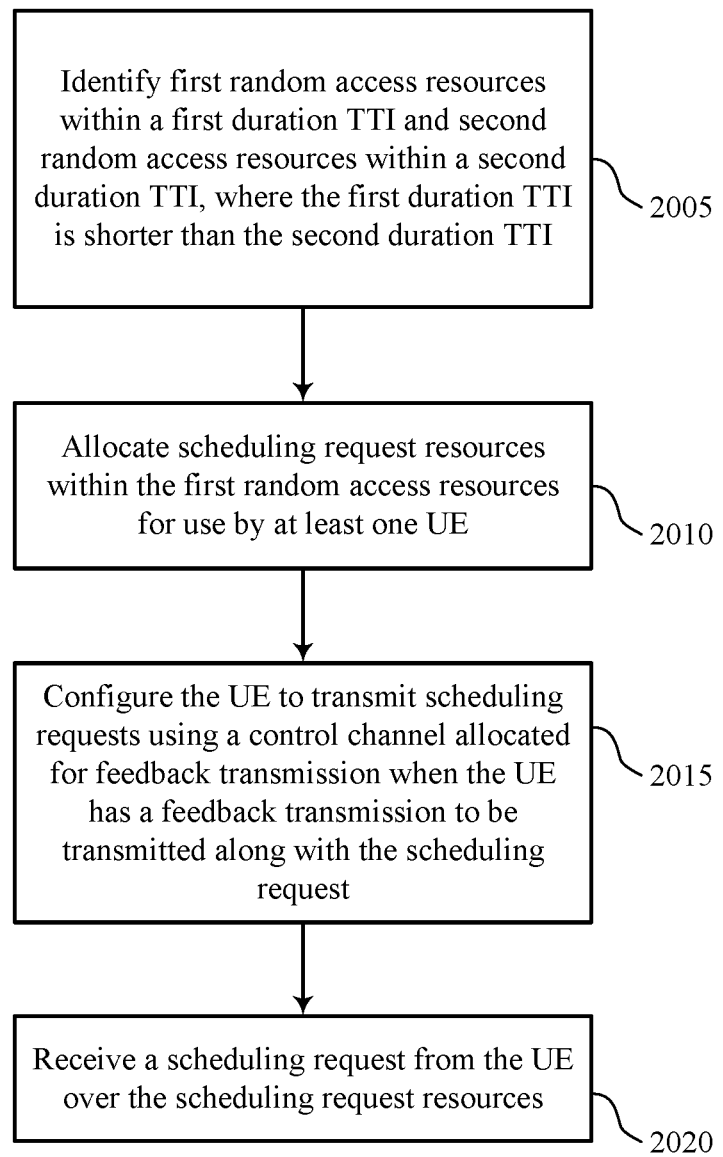

FIG. 20 shows a flowchart illustrating a method 2000 for SR techniques in wireless transmissions in accordance with aspects of the present disclosure. The operations of method 2000 may be implemented by a base station 105 or its components as described herein. For example, the operations of method 2000 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may identify first random access resources within a first duration TTI and second random access resources within a second duration TTI, where the first duration TTI is shorter than the second duration TTI. The operations of block 2005 may be performed according to the methods described herein. In certain examples, aspects of the operations of block 2005 may be performed by a random access resource manager as described with reference to FIGS. 10 through 13.

At block 2010 the base station 105 may allocate SR resources within the first random access resources for use by at least one UE. The operations of block 2010 may be performed according to the methods described herein. In certain examples, aspects of the operations of block 2010 may be performed by a SR resource manager as described with reference to FIGS. 10 through 13.

At block 2015 the base station 105 may configure the UE to transmit SRs using a control channel allocated for feedback transmission when the UE has a feedback transmission to be transmitted along with the SR. The operations of block 2015 may be performed according to the methods described herein. In certain examples, aspects of the operations of block 2015 may be performed by a SR resource manager as described with reference to FIGS. 10 through 13.

At block 2020 the base station 105 may receive a SR from the UE over the SR resources. The operations of block 2020 may be performed according to the methods described herein. In certain examples, aspects of the operations of block 2020 may be performed by a SR resource manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The various illustrative blocks and modules described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying first random access resources within a shortened transmission time interval (TTI) and second random access resources within a TTI, wherein a duration of the shortened TTI is shorter than the TTI;
   receiving configuration information from a base station, wherein the configuration information indicates resources within the shortened TTI that are dedicated for scheduling requests, wherein the resources comprise one or more of the first random access resources and wherein the resources are based at least in part on a likelihood of resource usage by the UE;
   generating a scheduling request based at least in part on the resources within the shortened TTI that are dedicated for scheduling requests; and
   transmitting the generated scheduling request using the resources within the shortened TTI that are dedicated for scheduling requests.

2. The method of claim 1, wherein the resources within the shortened TTI that are dedicated for scheduling requests comprise a cyclic shift for use when transmitting the generated scheduling request.

3. The method of claim 2, further comprising:
   receiving the cyclic shift in radio resource control (RRC) signaling from the base station.

4. The method of claim 1, wherein the first random access resources comprise a first subset of resources corresponding to the resources dedicated for scheduling requests and a second subset of resources dedicated for random access requests.

5. The method of claim 4, wherein the first subset of resources comprises a first subset of random access preamble signatures for transmitting scheduling requests and the second subset of resources comprises a second subset of random access preamble signatures for transmitting random access requests.

6. The method of claim 4, wherein the first subset of resources and the second subset of resources are time-varying across a plurality of shortened TTIs.

7. The method of claim 4, wherein the second subset of resources is split to include contention-based resources and contention-free resources.

8. The method of claim 1, further comprising:
   identifying which of a plurality of shortened TTIs include resources that are dedicated for scheduling requests based at least in part on the configuration information received from the base station.

9. The method of claim 8, wherein the configuration information comprises one or more of a periodicity function or a bitmap for determining which of the plurality of shortened TTIs include the resources that are dedicated for scheduling requests.

10. The method of claim 1, further comprising:
    determining that a second scheduling request is to be transmitted to the base station;
    determining that a feedback transmission is to be transmitted to the base station to indicate successful or unsuccessful reception of a received transmission; and
    generating the second scheduling request based at least in part on resources within a control channel allocated for the feedback transmission.

11. The method of claim 1, further comprising:
    receiving an indication of the resources dedicated for scheduling requests within the first random access resources within the shortened TTI from the base station, the resources dedicated for scheduling requests comprising a subset of available preamble signatures associated with the first random access resources.

12. The method of claim 1, wherein the resources that are dedicated for scheduling requests comprise a first preamble signature for use in transmitting the scheduling request, the first preamble signature selected based at least in part on a likelihood of signature usage.

13. The method of claim 12, wherein one or more of a cyclic shift spacing between the first preamble signature and one or more other preamble signatures or a contention category of the first preamble signature is selected based at least in part on the likelihood of signature usage.

14. The method of claim 12, wherein one or more of a cyclic shift spacing between the first preamble signature and one or more other preamble signatures or a contention category of the first preamble signature is selected based at least in part on a spatial separation of transmitters associated with the resources that are dedicated for scheduling requests.

15. A method for wireless communication at a base station, comprising:
    identifying first random access resources within a shortened transmission time interval (TTI) and second random access resources within a TTI, wherein a duration of the shortened TTI is shorter than the TTI;
    allocating scheduling request resources within the shortened TTI for use by a user equipment (UE), wherein the resources comprise one or more of the first random access resources and wherein the resources are selected based at least in part on a likelihood of resource usage by the UE;

transmitting, to the UE, configuration information comprising an indication of the allocated scheduling request resources within the shortened TTI; and receiving a scheduling request from the UE over the scheduling request resources within the shortened TTI.

16. The method of claim 15, wherein the scheduling request resources comprise a cyclic shift for transmission of the scheduling request.

17. The method of claim 16, further comprising:
transmitting the cyclic shift to the UE using radio resource control (RRC) signaling.

18. The method of claim 15, wherein the first random access resources comprise a first subset of resources for scheduling requests and a second subset of resources for random access requests.

19. The method of claim 18, wherein the first subset of resources comprises a first subset of random access preamble signatures for scheduling requests and the second subset of resources comprises a second subset of random access preamble signatures for random access requests.

20. The method of claim 18, wherein the first subset of resources and the second subset of resources are time-varying across a plurality of shortened TTIs.

21. The method of claim 18, wherein the second subset of resources is split to include contention-based resources and contention-free resources.

22. The method of claim 15, wherein the allocating further comprises:
configuring one or more of a periodicity function or a bitmap at the UE for determining which of a plurality of shortened TTIs include scheduling request resources.

23. The method of claim 15, further comprising:
configuring the UE to transmit scheduling requests using a control channel allocated for feedback transmission when the UE has a feedback transmission to be transmitted along with the scheduling request.

24. The method of claim 15, wherein the scheduling request resources comprise a subset of available preamble signatures associated with the first random access resources.

25. The method of claim 15, wherein the first random access resources comprise a first preamble signature for transmission of the scheduling request, the first preamble signature selected based at least in part on a likelihood of signature usage.

26. The method of claim 25, wherein one or more of a cyclic shift spacing between the first preamble signature and one or more other preamble signatures or a contention category of the first preamble signature is selected based at least in part on the likelihood of signature usage.

27. The method of claim 25, wherein one or more of a cyclic shift spacing between the first preamble signature and one or more other preamble signatures or a contention category of the first preamble signature is selected based at least in part on a spatial separation of UEs associated with the first random access resources.

28. An apparatus for wireless communication at a user equipment (UE), comprising:
a processor;
memory in electronic communication with the processor;
instructions stored in the memory and operable, when executed by the processor, to cause the apparatus to:
identify first random access resources within a shortened transmission time interval (TTI) and second random access resources within a TTI, wherein a duration of the shortened TTI is shorter than the TTI;
receive configuration information from a base station, wherein the configuration information indicates resources within the shortened TTI that are dedicated for scheduling requests, wherein the resources comprise one or more of the first random access resources and wherein the resources are based at least in part on a likelihood of resource usage by the UE;
generate a scheduling request based at least in part on the resources within the shortened TTI that are dedicated for scheduling requests; and
transmit the generated scheduling request using the resources within the shortened TTI that are dedicated for scheduling requests.

29. The apparatus of claim 28, wherein the resources within the shortened TTI dedicated for scheduling requests comprise a cyclic shift for use when transmitting the scheduling request.

30. An apparatus for wireless communication, comprising:
a processor;
memory in electronic communication with the processor;
instructions stored in the memory and operable, when executed by the processor, to cause the apparatus to:
identify first random access resources within a shortened transmission time interval (TTI) and second random access resources within a TTI, wherein a duration of the shortened TTI is shorter than the TTI;
allocate scheduling request resources within the shortened TTI for use by a user equipment (UE), wherein the resources comprise one or more of the first random access resources and wherein the resources are selected based at least in part on a likelihood of resource usage by the UE;
transmit, to the UE, configuration information comprising an indication of the allocated scheduling request resources within the shortened TTI; and
receive a scheduling request from the UE over the scheduling request resources within the shortened TTI.

* * * * *